US009727553B2

(12) United States Patent
Yakovlev et al.

(10) Patent No.: US 9,727,553 B2
(45) Date of Patent: Aug. 8, 2017

(54) SYSTEM AND METHOD FOR GENERATING AND USING USER SEMANTIC DICTIONARIES FOR NATURAL LANGUAGE PROCESSING OF USER-PROVIDED TEXT

(71) Applicant: ABBYY InfoPoisk LLC, Moscow (RU)

(72) Inventors: Egor Yakovlev, Moscow (RU); Anatoly Starostin, Moscow (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days.

(21) Appl. No.: 14/663,960

(22) Filed: Mar. 20, 2015

(65) Prior Publication Data
US 2016/0224541 A1 Aug. 4, 2016

(30) Foreign Application Priority Data
Feb. 3, 2015 (RU) ................................ 2015103467

(51) Int. Cl.
*G06F 17/28* (2006.01)
*G06F 17/27* (2006.01)
*G06F 17/30* (2006.01)

(52) U.S. Cl.
CPC ...... *G06F 17/2735* (2013.01); *G06F 17/2785* (2013.01); *G06F 17/30734* (2013.01)

(58) Field of Classification Search
CPC . G06F 17/2785; G06F 17/2735; G06F 17/277
See application file for complete search history.

(56) References Cited

U.S. PATENT DOCUMENTS

| 6,085,187 A | 7/2000 | Carter et al. |
| 8,069,185 B2 | 11/2011 | Martin et al. |
| 2004/0122656 A1* | 6/2004 | Abir ................. G06F 17/2872 704/4 |

(Continued)

OTHER PUBLICATIONS

Starostin et al. "A Production System for Information Extraction Based on Complete Syntactic-Semantic Analysis", online from <http://www.dialog-21.ru/digests/dialog2014/materials/pdf/StarostinAS.full.pdf>, public avaiable in 2014.*

(Continued)

*Primary Examiner* — Jialong He
(74) *Attorney, Agent, or Firm* — Lowenstein Sandler LLP

(57) ABSTRACT

A method, system, and computer program product for generating and using a user semantic dictionary for natural language involving receiving a user dictionary element definition associated with a user ontological object; generating the user semantic dictionary based on the user dictionary element definition, analyzing by a hardware processor the user-provided text to identify a portion of the user-provided text matching the semantic-syntactic data; generating a node in a semantic-syntactic tree, and further natural language processing of the user-provided text using the generated semantic-syntactic tree. The semantic-syntactic tree includes connected nodes, including references to the user ontological object or a reference to the first semantic dictionary structure. The generated user semantic dictionary includes a semantic dictionary structure with semantic-syntactic data and an identifier of the user ontological object.

18 Claims, 20 Drawing Sheets

(56) References Cited

U.S. PATENT DOCUMENTS

| | | | |
|---|---|---|---|
| 2005/0065773 A1* | 3/2005 | Huang | G06F 17/2735 704/7 |
| 2005/0154690 A1* | 7/2005 | Nitta | G06F 17/3061 706/46 |
| 2006/0100856 A1 | 5/2006 | Kang et al. | |
| 2008/0052262 A1* | 2/2008 | Kosinov | G06F 17/30244 |
| 2008/0091405 A1* | 4/2008 | Anisimovich | G06F 17/2755 704/4 |
| 2009/0055381 A1* | 2/2009 | Wu | G06F 17/2745 |
| 2009/0144609 A1* | 6/2009 | Liang | G06F 17/21 715/230 |
| 2009/0157401 A1* | 6/2009 | Bennett | G06F 17/27 704/243 |
| 2010/0161317 A1* | 6/2010 | Au | G06F 17/27 704/9 |
| 2011/0077936 A1* | 3/2011 | Arumugam | G06F 17/218 704/9 |
| 2011/0270607 A1* | 11/2011 | Zuev | G06F 17/27 704/9 |
| 2012/0109640 A1* | 5/2012 | Anisimovich | G06F 17/2755 704/9 |
| 2012/0310926 A1* | 12/2012 | Gannu | G06F 17/30702 707/723 |
| 2014/0114649 A1* | 4/2014 | Zuev | G06F 17/289 704/9 |

OTHER PUBLICATIONS

Jiang et al. "Learning and inferencing in user ontology for personalized Semantic Web search", Information Sciences 179, Elservier Inc. pp. 2794-2808, published in 2009.*

* cited by examiner

SYSTEM AND METHOD FOR GENERATING AND USING USER SEMANTIC DICTIONARIES FOR NATURAL LANGUAGE PROCESSING OF USER-PROVIDED TEXT

CROSS REFERENCE TO RELATED APPLICATIONS

This application claims the benefit of priority to Russian Patent Application No. 2015103467, filed Feb. 3, 2015; disclosure of which is incorporated herein by reference in its entirety.

FIELD OF TECHNOLOGY

The present disclosure relates generally to the field of natural language processing, and, in particular, to systems, methods and computer programs for generating and using user ontological models and user semantic dictionaries for natural language processing of user-provided text.

BACKGROUND

At present, the most important component in the field of automatic processing of text information presented in natural languages are technologies relating to ontologies. An ontology is a distinct formalized representation of knowledge about a particular subject, in other words, an ontology constitutes a representation of a particular field which includes a description of concepts of that particular field and the relations between them. Ontologies are developed by engineers and require tremendous efforts and knowledge in the field of computer linguistics. Ontologies do not have a universal, generally received structure, so that the set of developed ontologies is rather large. There is no unified correct method of creating ontologies. This is because the notions of how the model of the particular field needs to be organized are subjective in nature and reflect the world view of the particular developer and the purposes for which the ontology has been created.

In view of the above characteristics, there is a need to create a method which can expand a main ontology with ontologies which are intended for the purposes of the end user.

SUMMARY

Disclosed are systems, methods and computer programs for generating and using user ontologies and user semantic dictionaries for natural language processing of user-provided text.

In one aspect, an example method for generating and using a user semantic dictionary for natural language processing of user-provided text, the method comprising: receiving a first user dictionary element definition associated with a user ontological object; generating by a hardware processor the user semantic dictionary based on the first user dictionary element definition, wherein the generated user semantic dictionary includes: a first semantic dictionary structure comprising semantic-syntactic data and an identifier of the user ontological object; analyzing by a hardware processor the user-provided text to identify a portion of the user-provided text matching the semantic-syntactic data; generating by a hardware processor at least one node in a semantic-syntactic tree, wherein the semantic-syntactic tree includes a plurality of connected nodes, wherein the at least one node includes a reference to the user ontological object or a reference to the first semantic dictionary structure; and performing by the hardware processor further natural language processing of the user-provided text using the generated semantic-syntactic tree.

In another aspect, an example system for generating and using a user semantic dictionary for natural language processing of user-provided text, the system comprising: a user semantic dictionary input module configured to receive a first user dictionary element definition associated with a user ontological object; a user semantic dictionary generation module configured to generate the user semantic dictionary based on the first user dictionary element definition, wherein the generated user semantic dictionary includes: a first semantic dictionary structure comprising semantic-syntactic data and an identifier of the user ontological object; a text analysis module configured to: analyze the user-provided text to identify a portion of the user-provided text matching the semantic-syntactic data; a tree generation module configured to generate at least one node in a semantic-syntactic tree, wherein the semantic-syntactic tree includes a plurality of connected nodes, wherein the at least one node includes a reference to the user ontological object or a reference to the first semantic dictionary structure; and a natural language processing module configured to perform further natural language processing of the user-provided text using the generated semantic-syntactic tree.

In yet another aspect, an example computer program product stored on a non-transitory computer-readable storage medium, the computer program product comprising computer-executable instructions for generating and using a user semantic dictionary for natural language processing of user-provided text, comprising instructions for: receiving a first user dictionary element definition associated with a user ontological object; generating by a hardware processor the user semantic dictionary based on the first user dictionary element definition, wherein the generated user semantic dictionary includes: a first semantic dictionary structure comprising semantic-syntactic data and an identifier of the user ontological object; analyzing by a hardware processor the user-provided text to identify a portion of the user-provided text matching the semantic-syntactic data; generating by a hardware processor at least one node in a semantic-syntactic tree, wherein the semantic-syntactic tree includes a plurality of connected nodes, wherein the at least one node includes a reference to the user ontological object or a reference to the first semantic dictionary structure; and performing by the hardware processor further natural language processing of the user-provided text using the generated semantic-syntactic tree.

In some aspects, the first user dictionary element definition comprises a parent semantic class identifier; and the portion of the user-provided text matches semantic-syntactic data from a parent semantic class structure identified by the parent semantic class identifier. In some aspects, the parent semantic class structure is included in a main semantic dictionary. In some aspects, the first user dictionary element definition comprises a syntactic paradigm associated with the user dictionary element; the semantic-syntactic data comprises the syntactic paradigm; and the portion of the user-provided text matches the syntactic paradigm. In some aspects, the first user dictionary element definition comprises a natural language text string associated with user dictionary element; the semantic-syntactic data comprises the natural language text string; and the portion of the user-provided text corresponds to the natural language text string. In some aspects, the first semantic dictionary structure is a user term structure or a user lexical class structure;

and generating the first user dictionary element definition comprises semantic-syntactic analysis of the natural language text string. In some aspects, the first user dictionary element definition comprises the identifier of the user ontological object. In some aspects, the first user dictionary element definition is generated from a user ontological object definition. Some aspects further comprise receiving a second user dictionary element definition associated with the user ontological object; the generated user semantic dictionary further includes: a second semantic dictionary structure comprising the identifier of the user ontological object.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

Figure 1A:
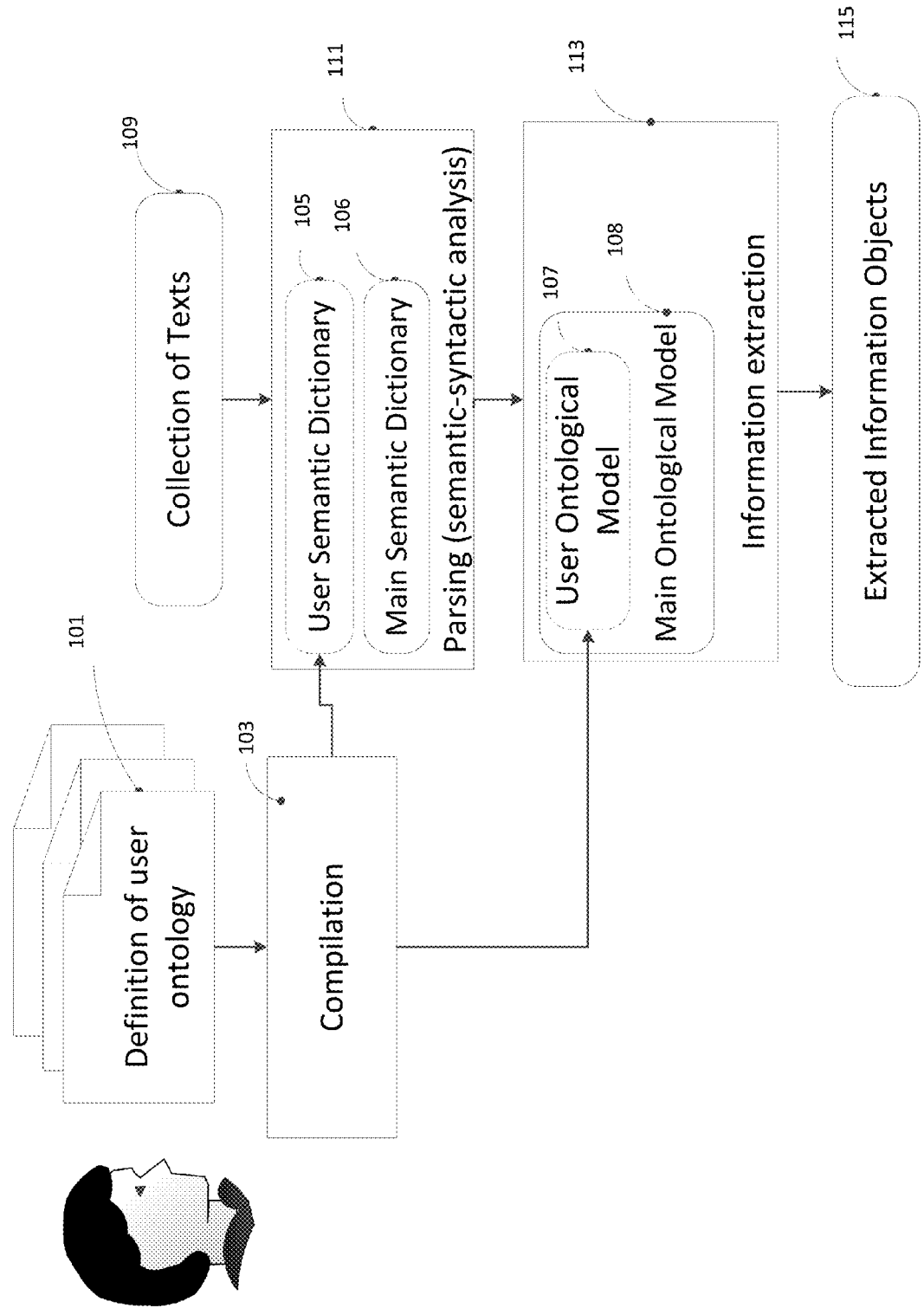
FIG. 1A illustrates an example method for generating and using a user ontological model and a user semantic dictionary in accordance with one example aspect.

The following detailed specification makes references to the accompanying drawings. The same symbols in the drawings refer to the same components, unless otherwise indicated. The sample aspects presented in the detailed specification, the drawings and the patent claims are not the only ones possible. The example aspects can be used or modified by other methods not described below, without abridging their scope or their essence. The different variants presented in the specification of the example aspects and illustrated by the drawings can be arranged, replaced and grouped in a broad selection of different configurations, which are examined in detail in the present specification.

DETAILED DESCRIPTION

Example aspects are described herein in the context of a system and method for generating and using user ontological model and user semantic dictionary for natural language processing of user-provided text. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

An ontology is an explicit formal description of a particular subject field. The principal elements of an ontology are the concepts (or classes, in other words), instances, relations, and properties. The concepts in an ontology form a formally described nominative set of instances which are generalized in terms of a particular feature. An example of a concept is the set of persons brought together in the concept "Person". The concepts in an ontology are unified into a taxonomy, i.e., a hierarchical structure. An instance is a specific object or phenomenon of the subject field which enters into a concept. For example, the instance Yury_Gagarin enters into the concept "Person". Relations are formal descriptions between concepts which stipulate what links can be established between the instances of given concepts. In addition to this, the instances have features, or properties.

Due to the fact that the information represented in an ontology is not exhaustive, depending on the area of application of the ontology the information in it may be supplemented with knowledge from the field under study, in other words, the ontology can be expanded.

Disclosed herein are methods and systems for creation of user ontological models which can supplement existing main ontological model with new user subclasses and instances, substantially increasing the accuracy of processing of text data represented in natural language.

An ontological model is a combination of an ontology with a set ontological rules for extracting information from text, and described below. The main ontological model may be provided to the user, while the user ontological model may be created by the user by compiling a definitions describing the user ontology together with the main ontological model.

The purpose for creating user ontologies (that further are compiled into user ontological models) is to supplement the main ontologies (that are compiled into main ontological model) with user concepts and instances not found in the main ontologies. This is due to the fact that user ontological objects (that is, user concepts and instances) are often unique and specific to a particular field of knowledge, so that they might not be accessible in public sources of information. Examples of user ontological objects are the names of companies in a particular field, the names of the employees of a particular company, the names of the products of a given company, and so on. As a result, unique and specific ontological objects may be absent from the main ontologies and unless this information is provided directly by the end user these concepts and instances might not be found in the main ontologies. Yet despite these drawbacks, there is often a need for processing of text data containing information about the aforementioned objects. Therefore, the creation of a method allowing any user to create a user ontological model in dependence on the problems confronted by him is an important aspect in the field of processing of unstructured text information.

The creation of user ontological model helps increase the accuracy of processing of text data represented in natural language, and specifically to increase the accuracy of the semantic-syntactic analysis of a text and the operation of the algorithm and system for extraction of information (facts, entities).

Besides this, the method presented below makes it possible to remove ambiguity from a text, that is, during the semantic-syntactic analysis of a text the system is able to distinguish identical names of different objects depending on the context, for example, to extract objects having identical names, both as an organization and as a person. Moreover, the system is able to select the most appropriate object for a particular case, and extract facts in which said objects are involved.

The main principles of the semantic-syntactic analysis on the basis of linguistic descriptions are described in the U.S. Pat. No. 8,078,450, incorporated herein by reference in its entirety. Since such analysis is based on the use of language-independent semantic units, the present example aspect is likewise independent of language and can work with one or more natural languages.

In the context of the present specification, there are two possible methods for implementing the proposed example aspects. The first method of implementation involves the possibility of performing a secondary semantic-syntactic and ontological analysis of the text (corpora of text) in order to extract information that was not extracted in the first stage of the semantic-syntactic analysis using only the main ontologies and main dictionary with inadequate precision. The second method of implementation pertains to a so-called preventive use. According to a preventive use, a user ontological model is created in advance and used along with an already existing main ontological model to extract information objects (entities and facts) from the text data being analyzed.

FIG. 1A illustrates an example method for generating a user ontological model in accordance with one example aspect. This method constitutes a preventive use. Preventive use in this context means that the user can know in advance which information might be contained in the text data and, consequently, know which information objects can be extracted from this text data 109 (collections/corpora of texts) in the process of deep semantic-syntactic analysis 111 and process of information extraction (113), which will be described in greater detail below. Information in this context can be entities and phenomena of the real world, namely, persons, organizations, locations, and so on, and facts relating to them.

In an example aspect, the extraction of information from text involves and results in generating information objects representing the ontological objects (such as entities or facts) described, referred to, or mentioned in the text.

According to FIG. 1A, in step 101, the user can provide a definition(s) of the user ontology which includes information which in the opinion of the user may be contained in the collection (corpus) of texts 109, and which after deep semantic-syntactic analysis (111) can be extracted from this collection (corpus) of texts 109 with the help of an information extraction module 113. Among the extracted information objects (115), such as entities and facts extracted by ontological (extraction) rules, are information objects based on ontological objects defined by the user for the user ontology (101). These information objects would not have been extracted from the texts 109 if the user ontological model were not used, because a corresponding class (semantic class or lexical class or term) would be absent in the semantic dictionary and the extraction rules would not be able to determine what class to use. For example, in the sentence "Takayama does a part-time job for IBM" the word "Takayama" might be not defined by the system (without the user semantic dictionary and user ontological model) due to its uniqueness or, in other case, might refer to a person or to an organization; extraction rules cannot determine which is the case unless this information is supplied to the user via the user ontology definitions.

As mentioned above, the definition of the user ontology 101 may include information of the following content: lists of cities of a certain region, lists of employees of a certain company, and so on. The definition of the user ontology can be provided in a file of a certain predetermined format (such as a txt-file) prepared by a user, or be generated automatically from data gathered from various sources and/or from user input through a program providing user interface. The definition of user ontology (101) may comprise definition of user ontological instance(s) or user ontological concept(s).

This file with the definition of the user ontology (101) is put into a compiler (103). The format of presenting the information by the user in the definition of the user ontology 101 makes it possible to expand the main ontologies already existing in the system and add user concepts and instances to the main ontologies. The structure of the main ontologies will be presented below.

Figure 1B:
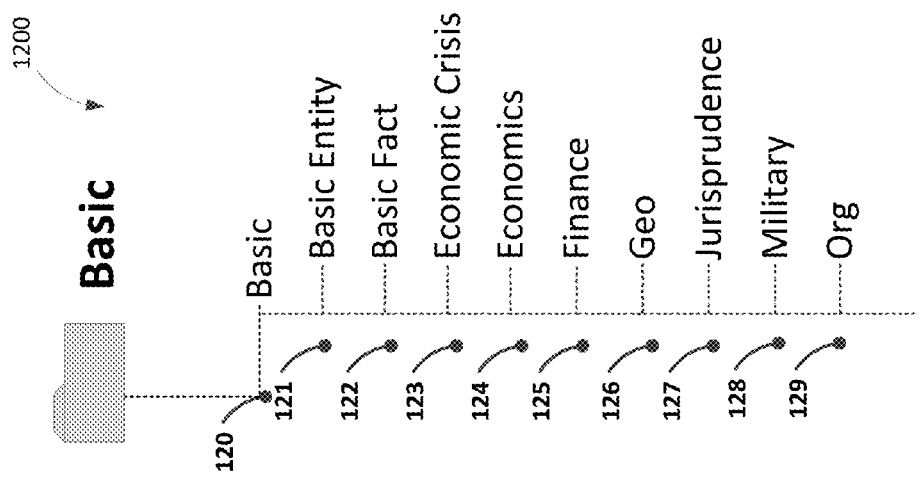
FIG. 1B illustrates an example of a hierarchical structure in the main ontology in accordance with one example aspect.

The main ontologies (FIG. 1C 1200, FIG. 1B, 1200) together with the ontological rules (131, FIG. 1C) form the main ontological model 108, which constitutes a formalized representation of a certain object field. The term "ontological model" within the described invention comprises combining ontology and ontological rules. The ontology includes a formal definition of elemental (indivisible) units of the object field (instances), a formal definition of various associations (concepts/classes) and a formal definition of the relations between instances. According to the proposed example aspects, the main ontologies are combined into a hierarchical system of ontologies. Thus, FIG. 1B illustrates the main ontologies of Basic Entity (121), Basic Fact (122), Economic Crisis (123), Economics (124), Finance (125), Geo (126), Jurisprudence (127), Military (128), Org (129) and so on, which are inherited from the ontology Basic (120). This does not present a complete list of the existing main ontologies. The list of main ontologies is illustrative and not limiting of the field of the given example aspects. Upon inheritance, the concepts, instances and relations belonging to the parent ontology Basic (120) also belong to the descendant ontologies.

A concept (essentially, a class) is an element of an ontology which reflects a particular notion of the object field. A set of instances (lower-level ontology elements) is unified into a single concept. For example, all instances corresponding to people are unified into the concept "Person". Each concept in the ontology corresponds to a group of relations having this concept as their domain. This group of relations defines which connections are possible for an instance of the given concept. Furthermore, this concept is related to a group of simple restrictions and a group of parent concepts. All of this likewise defines what the instances of a given concept can be.

All the concepts in an ontology can be represented as a tree structure, in which the "thick branches" represent general concepts, and the "thin branches" represent narrow concepts. For example, the thick branch "Organizations" is divided into more thin branches: "Commercial Organizations", "Governmental Organizations", and so on. Besides this, the described structure of concepts may allow for multiple inheritance. For example, "Commercial Organizations" are a sub-concept of the concept "Organizations" and a sub-concept of the concept "Objects of Purchase and Sale" at the same time. Concepts can form, instead of a tree structure, a graph of a more general form, in which there can be several root vertices, which means that the graph is not necessarily connected, i.e., it is an acyclic directed graph.

An instance is a lower-level ontology element, a member of a group of specific representatives of the concept. Thus, for example, the concept "Season" has 4 instances: "Spring", "Summer", "Autumn", and "Winter". The instances are created to populate the database for a particular field. Each instance relates to a particular single concept. Each instance is associated with a group of relations. According to the proposed example aspects, the following information on the instance can be kept in the ontology: an identifier of the ontology to which the instance pertains, a unique identifier within the ontology, the name (in various languages), the list of concepts to which the instance pertains, named relations with other instances, and properties (the values of the string properties can be presented in various natural languages). The above description of the organization of an ontology applies both to main ontologies and to the user ontologies which may be incorporated into existing main ontologies.

Figure 1C:
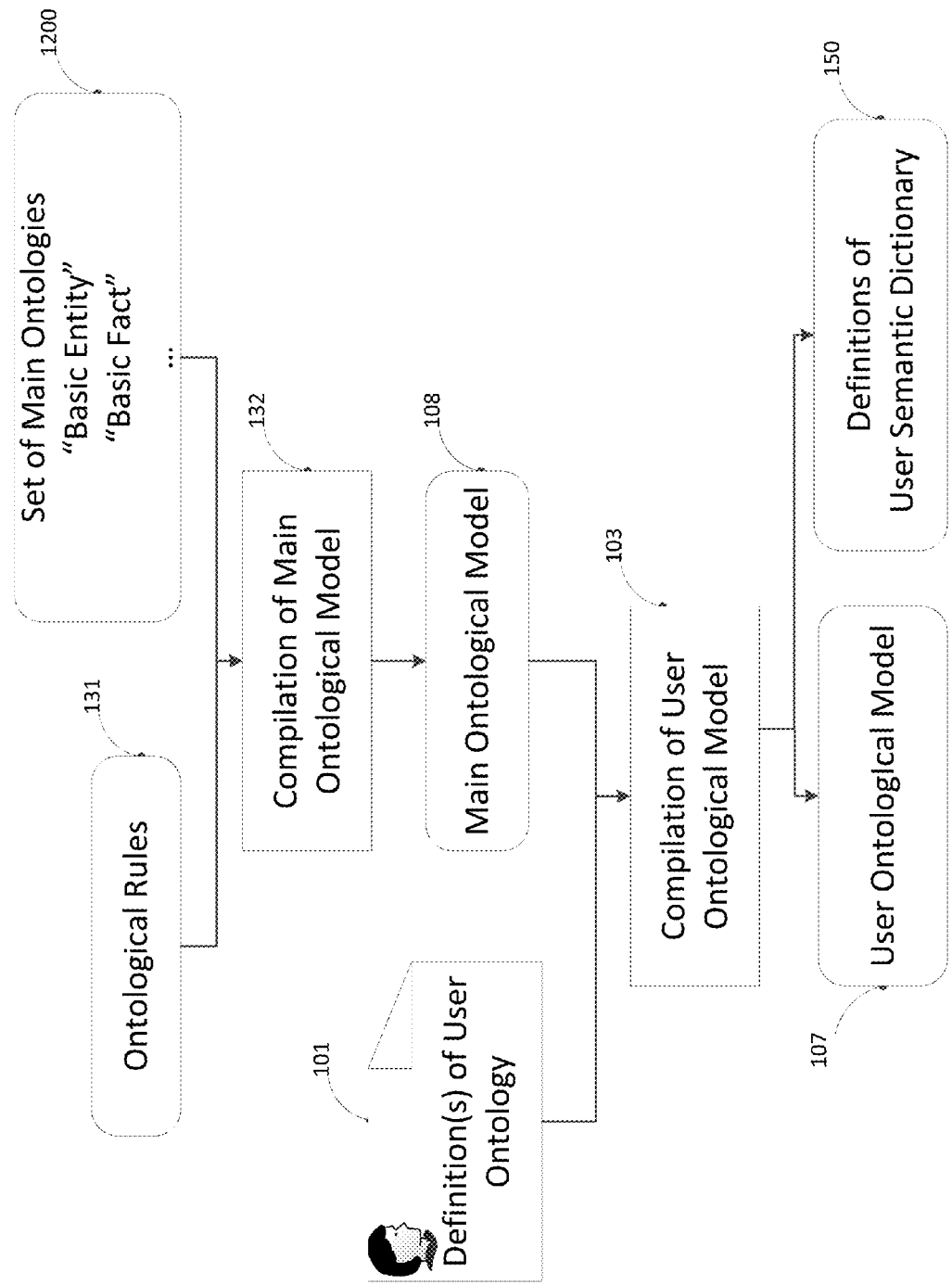
FIG. 1C illustrates the process of compiling the definition of a user ontology in the framework of existing main ontological model for receiving user ontological model in accordance with one example aspect.

FIG. 1C illustrates in greater detail the process of compiling the definition of a user ontology (101). As already mentioned above, the main ontologies (Basic Entity (121), Basic Fact (122), Economic Crisis (123), Economics (124), Finance (125), Geo (126), Jurisprudence (127), Military (128), Org (129), and so on) form a hierarchical structure. These ontologies along with certain ontological rules (131) constitute the main ontological model (108) used in the operation of the information extraction module (113). The main ontological model (108) is created by compiling the main ontologies (1200) with libraries of ontological rules (131). After this, within the main ontological model (108) the definition of the user ontology (101) is compiled (103). As a result, a user ontological model (107) is generated, which along with the main ontological model may be used in the information extraction module. The compiled user ontological model may include user instance structures or user concept structures that are stored in memory and have information about the generated user instances and user concepts. User instance structure and user concept structure are generated based on definition of user ontology (101). Each of the generated user instances and user concepts may have their unique identifiers. The compiled user ontological model (107) can be given a name with which the user ontological model can be referred to. In one aspect, the main and the user ontological model form an expanded ontological model; however, the main ontological model can be used independently of the user ontological model.

Let us turn to FIGS. 1A and 1C, which demonstrate the compilation of a definition of a user ontology (101). The format for presentation of information by the user in the definition of the user ontology 101 makes it possible, when introducing a new user ontological object (which, depending on the purposes of the user, can be either a user instance or a user concept), to indicate which already existing concept in the main or user ontology (1200) the new ontological object is to be assigned, the name of this user ontological object, and a text string from which this object may be extracted.

One example of the format may be the following. Examples of the format for entering information into the definition of the user ontology (101) are demonstrative and do not limit the range of the possible aspects. Thus, for example, the record Geo: InhabitedLocality, northern_Kachin_IndividualName, "northern Kachin"

indicates that it is necessary to create a user instance with the name northern_Kachin_IndividualName, which is a descendant of an existing concept InhabitedLocality within the main ontology Geo (126, FIG. 1B), where InhabitedLocality is the name of the concept in the main ontology Geo, which includes inhabited localities: cities, towns, villages, stations, farms, etc. In addition, the natural language string indicates the phrase from which the user instance northern_Kachin_IndividualName is to be extracted—"northern Kachin". After compilation (103) of this record in the definition of the user ontology (101), resulting in the creation of the user instance northern_Kachin_IndividualName, which is a descendant of the existing concept InhabitedLocality in the main ontology Geo, in the text "John works in northern Kachin" the information object northern_Kachin_IndividualName will be extracted as a location in step 113.

For example, the user wishes to extract from the text the organization known as "Bloomberg", which is mentioned in the sentence: "Bloomberg, the global business and financial information and news leader, gives influential decision makers a critical edge by connecting them to a dynamic network of information, people and ideas". For this, the record in the file containing the definition of the user ontology might be as follows:
Org: Organization, Bloomberg_IndividualName, "Bloomberg"
This record indicates that it is necessary to create a user instance Bloomberg_IndividualName within the main ontology Org (129, FIG. 1B), with information about all kinds of organizations, as a descendant of the concept Organization, where Organization is the name of a concept in the main ontology Org, which includes long-lasting structured associations of people. The natural language string indicating the text phrase from which the user instance may be extracted is "Bloomberg". After compilation (103) of this record in the definition of the user ontology (101), in the original sentence the information object Bloomberg_IndividualName will be extracted as an organization in step 113.

If the same name can refer to different objects (for example, a person and a geographical location), it is necessary to introduce all possible variants into the definition of the user ontology (101), specifying to which existing concepts in main ontology(ies) these user instances belong. For example, the user wishes to extract the person "Takayama" from the text. A mention of the person "Takayama" is encountered in the English sentence "Takayama is a Japanese professional boxer who is the current mini flyweight champion." Accordingly, the record in the txt-file may be as follows:
Be: Person, Takayama_ IndividualName, "Takayama"
This record contains information that it is necessary to create a user instance with the name Takayama_IndividualName within the main ontology Basic Entity (121, FIG. 1B), keeping information about main ontological objects, as a descendant of the concept Person (which includes persons) in the main ontology Basic Entity. The natural language string indicating the text phrase from which the user object should be extracted is "Takayama". After compilation (103) of this record in the definition of the user ontology (101), the information object Takayama_IndividualName may be extracted as a person in a sentence in step 113.

A situation is possible in which besides a person the user wishes to extract the location "Takayama". The location "Takayama" is encountered in the English sentence "Takayama is a city located in Gifu Prefecture, Japan." The record in the definition file for the user ontology might be as follows:
Geo: InhabitedLocality, Takayama_IndividualName, "Takayama"
This record contains information such that it is necessary to create the user instance with the name Takayama_IndividualName within the main ontology Geo (126, FIG. 1B) as a descendant of the concept InhabitedLocality. The natural language string indicating the text phrase from which the user instance should be extracted is "Takayama". After compilation (103) of this record in the definition of the user ontology (101), the information object Takayama_IndividualName may be extracted as a location in a sentence in step 113.

Besides creating user instances which are descendants of concepts from the main ontology (1200, FIG. 1C), the user may create user concepts which are descendants of concepts in the main ontology. For this, the user may indicate in the input file (101), for example:
Be: Person, Cosmonaut
which means it is necessary to create the user concept Cosmonaut, which is a descendant of the concept Person in the main ontology Basic Entity (121, FIG. 1B).

The present example aspects make it possible to create user instances which can be not only descendants of existing concepts in the main ontology but also descendants of concepts introduced by the user (user concepts). For this, the user can specify the following:
Concepts:
Be, Person, Cosmonaut
Instances:
Cosmonaut, Yuri_Gagarin_IndividualName, "Yuri Gagarin"
This record in the definition of the user ontology (101) means it is necessary to create a user concept Cosmonaut, which is a descendant of the concept Person in the main ontology Basic Entity (121, FIG. 1B). Besides this, it is necessary to create the user instance Yuri_Gagarin_IndividualName, which is a descendant of the user concept Cosmonaut, and which may be extracted from the natural language text string "Yuri Gagarin". After compilation (103) of this record in the definition of the user ontology (101), the object Yuri_Gagarin_IndividualName will be extracted as a person from a sentence in step 113.

In FIG. 1A, the file containing the definition of the user ontology (101), for example, in the format described above, is compiled in step (103). The compilation of the user ontological model occurs in the context of the previously compiled main ontological model (108). As a result of the compilation 103 of the input definition of the user ontology (101), a user ontological model 107 is created, which is incorporated into the existing main ontological model 108, and the results of the compilation of the user ontological model are used to create the user semantic dictionary 105, which is incorporated into the existing main semantic dictionary 106. Results of compilation 103 of definition of user ontology 101 within the main ontological model 108 are user instances structures or user concepts structures that are stored in memory. User instances structures and user concepts structures have their unique identifiers.

Figure 7:
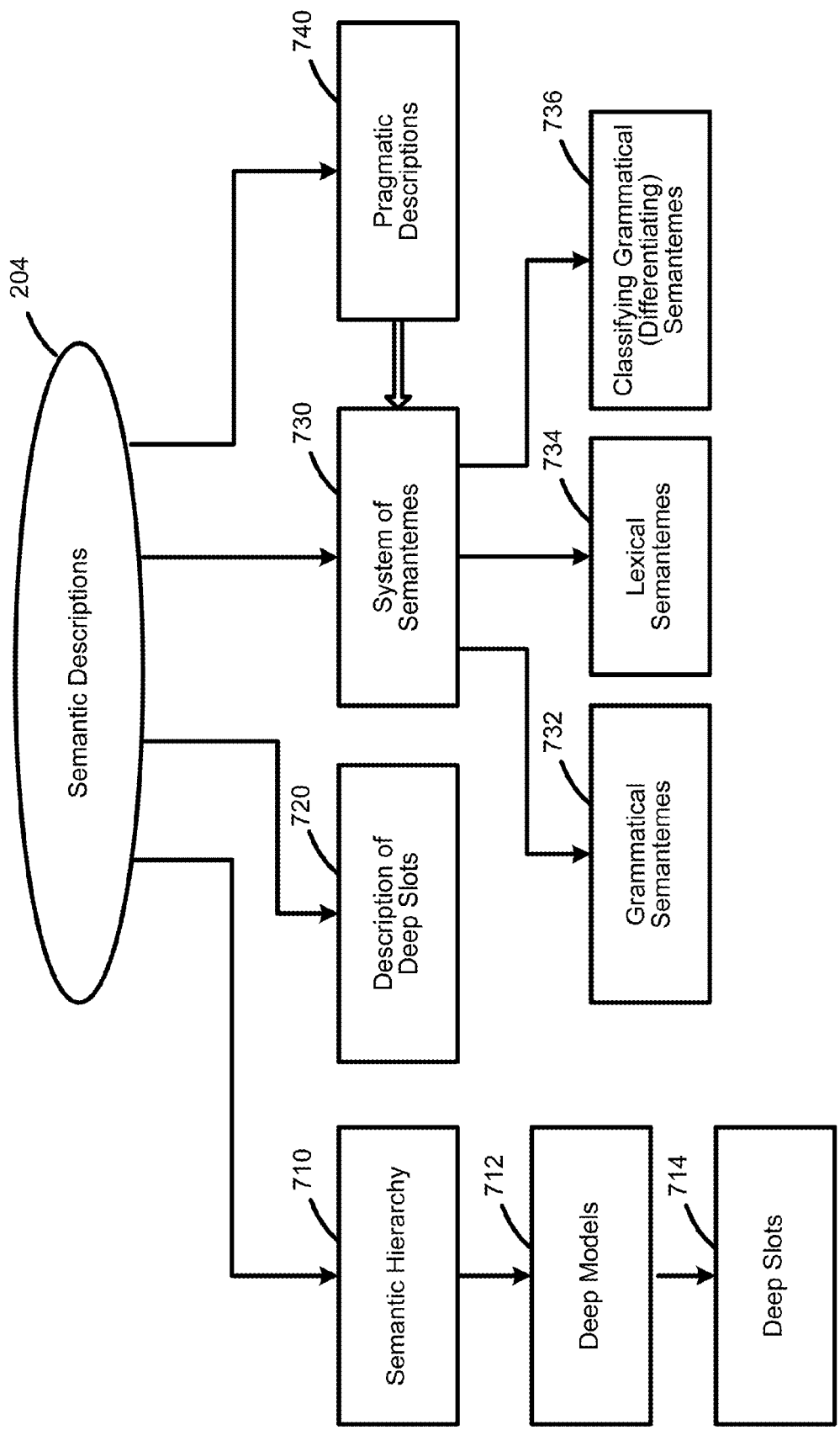
FIG. 7 illustrates an example of semantic descriptions in accordance with one example aspect.

According to one example aspect, the main ontologies (FIG. 1B, 121-129) may be related to the elements of a universal semantic hierarchy (SH) (FIG. 7, 710). The semantic hierarchy (SH) constitutes a lexical-semantic dictionary containing the entire lexicon of the language needed for text analysis and synthesis. The semantic hierarchy may be organized in the form of a tree of genus/species relations, at the nodes of which are found the semantic classes (SC)—universal ones (common to all languages), reflecting a certain conceptual content, and lexical classes (LC), being language specific and the descendants of a certain semantic class. The totality of lexical classes of a single semantic class determines the semantic field—a lexical term for the conceptual content of a semantic class. The most widespread concepts are found at the upper levels of the hierarchy.

A lexical class in a specific-language descendant of a semantic class. A lexical class is an expression of an underlying meaning in a specific language. For example, the lexical classes "male" and 'female" are specific-language (English) expressions for the semantic class ANIMAL_BY_SEX. The combination of lexical classes belonging to the same semantic class defines a semantic field—a lexical expression of the conceptual content of the semantic class. A single lexical class is a single meaning of a word; for example, since the word (or rather a lexeme) "key" has several meanings, several lexical classes may be created for this word. A single lexical class contains all words (or word forms) differentiated only grammatically, without any semantic differentiation.

A term is a combination of several words; a term is an immediate descendant of a semantic class. A term is not an idiom; it does not form an entirely new conception. A combination of words forming a term (for example, "high school", "web site", "uniform resource locator") represents some species of the term's core concept. A term is usually a stable combination of words, expressing a single unified concept. A term is often a comparatively narrow concept, a species of the term's core.

For example, the phrase "guinea pig" has nothing to do with regular pigs and does not denote a pig species. Therefore, the phrase "guinea pig" cannot constitute a term, it is clearly an idiom. On the other hand, "tea rose" and "musk rose" refer to species of rose; they should be classified as terms belonging to the semantic class ROSE. The combinations of words forming terms are usually translated by another analogous combination of words, less frequently by a separate lexical class, and even less frequently by another lexical class (determined by the term's core). For example, an English term "advance corporate tax" (1:3081579) is translated into Russian as " авансовый корпоративный налог " (1:3081580); an English term "air freight" (1:2776800) is translated into Russian as "авиагруз" (1:2776797)".

A term is not a lexical class; it does not have its own deep or surface model; term's deep and surface characteristics are borrowed from its core. Therefore all components of a term must be described within the term core's model; the term's core must have a deep and a surface model to analyze the term.

A filial (child) semantic class in the semantic hierarchy may inherit the majority of properties of its direct parent and of all its predecessor semantic classes. For example, the semantic class SUBSTANCE is a filial semantic class of the class ENTITY and the parental semantic class for the classes GAS, LIQUID, METAL, WOOD_MATERIAL, and so on.

For a concept in the main ontologies (FIG. 1B, 121-129) a certain semantic class from the semantic hierarchy can be indicated as typical of that concept. This semantic class relates the concept of the ontology to the semantic hierarchy. For example, the semantic class from the semantic hierarchy TOWN_BY_NAME can be assigned to the concept InhabitedLocality in the main ontology Geo.

Figure 1D:
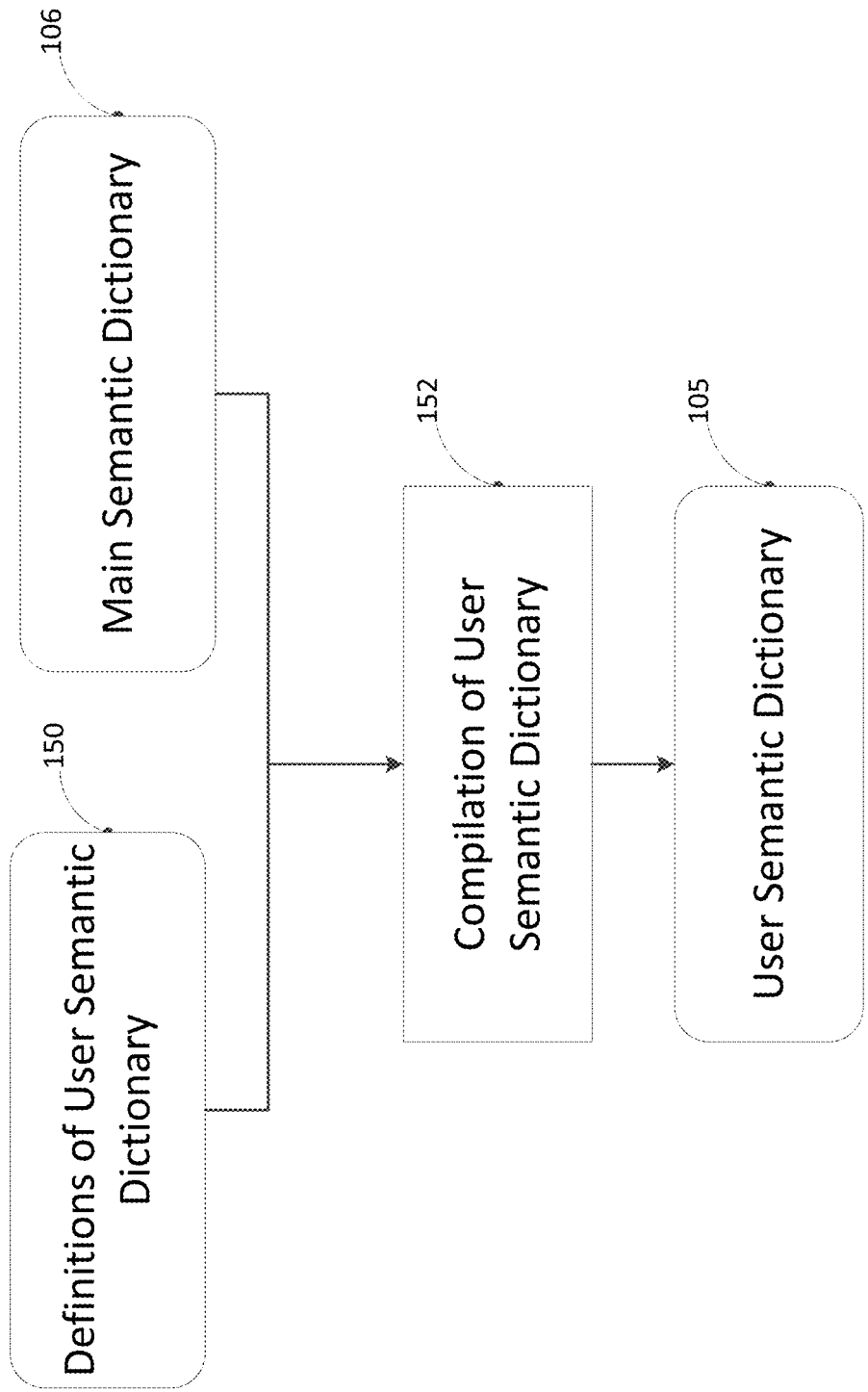
FIG. 1D illustrates the example method for generating a user semantic dictionary in accordance with one example aspect.

FIG. 1D illustrates an example method of creating a user semantic dictionary (105) according to one example aspect. As shown in FIG. 1C, one of the results of the compiling (103) of the definition of a user ontology (101), besides the creation of the user ontological model, is the creation of a definition of the user semantic dictionary (150), which is then compiled (152) in the framework of the main semantic dictionary (106) into a user semantic dictionary (105). In one example aspect, the main and the user semantic dictionaries can form an expanded semantic dictionary; however, the main semantic dictionary can be used independently of the user semantic dictionary. The definition of the user semantic dictionary (150) may include at least one dictionary element definition. After the compilation (152) of definition(s) of the user semantic dictionary (150) within the main semantic dictionary (106), user semantic dictionary is created. User semantic dictionary includes semantic dictionary structures.

For example, in the process of creation of a user semantic dictionary 105 based on the previous example, the definition of the user ontology 101 contains the record:

Geo: InhabitedLocality, Takayama_IndividualName, "Takayama"

As mentioned above, this record contains information that it is necessary to create a user instance with the name Takayama_IndividualName to be incorporated into the main ontology Geo (126, FIG. 1B) as a descendant of the concept InhabitedLocality. Furthermore, the text string from which the user instance can be extracted is "Takayama".

As a result of the compiling of the user semantic dictionary 105, for the natural language strings indicating the text where the user ontological object (i.e., a user instance) is supposed to be extracted a user lexical class or term is created, in the present example, the user lexical class "Takayama", which is a descendant of the semantic class assigned to the parent concept of the user instance Takayama_IndividualName in the main ontology, specifically, the concept InhabitedLocality in the main ontology Geo. Since in the cited example the semantic class TOWN_BY_NAME had been assigned to the concept InhabitedLocality, the user lexical class "Takayama" is therefore assigned to the main semantic class TOWN_BY_NAME.

The process of creation of a user semantic dictionary 105 may be as following. The following information in the definition of user semantic dictionary (150) is put into the compiler (152) of the user semantic dictionary, in other words at least one dictionary element definition: the semantic class from the main semantic dictionary (106) to which the user semantic class or user lexical class or user term is to be assigned; the syntactic paradigm or part of speech; the natural language string indicating the text of the user term or user lexical class being introduced; an identifier which will keep a reference to the user ontological object (user instance) created in the process of compiling the user ontological model. This identifier, assigned to the user instance, is also used afterwards in the process of extracting information objects for the extracting of user objects. This identifier can store information including an identifier of the user ontological object in the user ontological model, identifiers of the parent classes, and so on. The information stored in the identifier makes it possible to use the user semantic dictionary (105) separate from the user ontological model (107). For example, the user semantic dictionary 105 can be used when translating text from a source language to a target language. For example, the following information (dictionary element definition) can be input into the compiler 152 of the user semantic dictionary:

TOWN_BY_NAME; Noun; "Takayama"; id_Takayama_IndividualName.

Here TOWN_BY_NAME is the semantic class from the main semantic dictionary (106); Noun is the part of speech or syntactic paradigm; "Takayama" is the natural language string indicating the text of the user term or user lexical class being introduced; id_Takayama_IndividualName is an identifier reference to the user ontological object (user instance) created in the process of compilation of the user ontological model. The example of the format in which information is presented in the definition of the user semantic dictionary (150) is demonstrative and does not limit the field of the proposed example aspects.

The compilation of the definition of the user semantic dictionary (150) occurs in the framework of the already existing main semantic dictionary (106).

As a result of the compilation (152) of this string in the framework of the main semantic dictionary (106), the user lexical class "Takayama" is created and assigned to the existing main semantic class TOWN_BY_NAME.

The main semantic dictionary may be created on the basis of the semantic hierarchy (SH), which was described above. The structure of the main semantic dictionary is as follows. The main semantic dictionary may contain a list of identifiers of semantic classes, lexical classes, and terms. The identifiers of the semantic classes refer directly to the definitions (descriptions) of the semantic classes, which are also contained in the main semantic dictionary. A definition (description) of the semantic class includes a list of parental semantic classes, filial semantic classes, lexical classes, or terms of the given semantic class, and may also contain additional information such as properties of the semantic class, diathesis, deep slots, and so on.

The compiled user semantic dictionary 105 has a similar structure. Namely, the user semantic dictionary also contains a list of identifiers of semantic classes, terms, or lexical classes, except that this list includes both identifiers of semantic classes contained in the main semantic dictionary and identifiers of user semantic classes (or lexical classes or user terms). A user semantic class or lexical class is assigned to a semantic class in the main semantic dictionary. Apart from this, the user semantic dictionary includes descriptions of the user semantic or lexical classes or terms. The description of the user semantic classes contains a list of the parental semantic classes, the filial terms or semantic or lexical classes, the properties of the semantic class, the diathesis, the deep slot which may be inherited from the parental semantic class of the main semantic dictionary. The identifiers of the semantic classes refer to the description of the semantic class from both the user semantic dictionary and the main semantic dictionary.

Moreover, the user semantic dictionary can be given not only semantic and lexical classes, but also terms. For the creation of terms in the user semantic dictionary, a semantic analysis is performed on the natural language string containing the text of the user term or user semantic or lexical class being introduced, making use of the main semantic dictionary (106). For example, for (Geo: InhabitedLocality, northern Kachin IndividualName, "northern Kachin"), during the compiling of the user semantic dictionary (105) there will be performed a semantic analysis (111) of the text phrase "northern Kachin", making use only of the main semantic dictionary (106).

In some example aspects, the user semantic dictionary based on the user information provided in the definition of the user ontology (see, FIG. 1, 101) may also include synonymous words or phrases. This definition is compiled resulting in generation of a user ontological model and of a user semantic dictionary definition. In the user semantic dictionary generated with this definition, the synonymous lexical classes and terms belong to a single user semantic class generated for this purpose. For example, the definition of the user ontology may contain several entries for the same instance named RosBusinessConsulting_IndividualName.

Org: Organization, RosBusinessConsulting_IndividualName, "RosBusinessConsulting"
Org: Organization, RosBusinessConsulting_IndividualName, "РБ К"
Org: Organization, RosBusinessConsulting_IndividualName, "RBC"
Org: Organization, RosBusinessConsulting_IndividualName, "Russian Business Consulting"

A single instance named RosBusinessConsulting_IndividualName would be generated for the user ontological model after compiling. The semantic dictionary would be generated using the following input:
OGANIZATION_BY_NAME; Noun; "RosBusinessConsulting"; (id_RosBusinessConsulting)
OGANIZATION_BY_NAME; Noun; "РБ К"; (id_RosBusinessConsulting)
OGANIZATION_BY_NAME; Noun; "RBC"; (id_RosBusinessConsulting)
OGANIZATION_BY_NAME; Noun; "Russian Business Consulting"; (id_RosBusinessConsulting)

A single label or identifier id_RosBusinessConsulting refers to the single user instance RosBusinessConsulting_IndividualName. The user semantic dictionary would contain several user lexical classes ("RosBusinessConsulting", "РБ К", "RBC") and a user term ("Russian Business Consulting"), which are descendants of a single user semantic class, which in turn is a descendant of a semantic class (OGANIZATION_BY_NAME) in the main semantic dictionary.

Described above creation of synonymous words or phrases in the user semantic dictionary may be used in various applications of natural language processing. For example it may be used in semantic searching.

As shown in FIG. 1A, the user semantic dictionary (105) along with the main semantic dictionary (106) may be used afterwards in the process of semantic-syntactic analysis of the text data (111). The semantic-syntactic analysis of texts of a corpus (111, FIG. 1) allows obtaining the syntactic and semantic structures for the sentences from the corpus of texts and to coordinate them with the elements of the semantic hierarchy (SH) and the ontologies (107, 108), which in turn makes it possible to extract information from the collection (corpus) of texts 109 being analyzed. A detailed description of the semantic-syntactic analysis is presented below.

The user semantic dictionary together with the main semantic dictionary, after the semantic-syntactic structures (208) of the sentences of the source text (109) have been obtained, can be used both for the working of the information extraction module (113) and for the translation of texts (109) from one (source) natural language to another (target) language.

Figure 3:
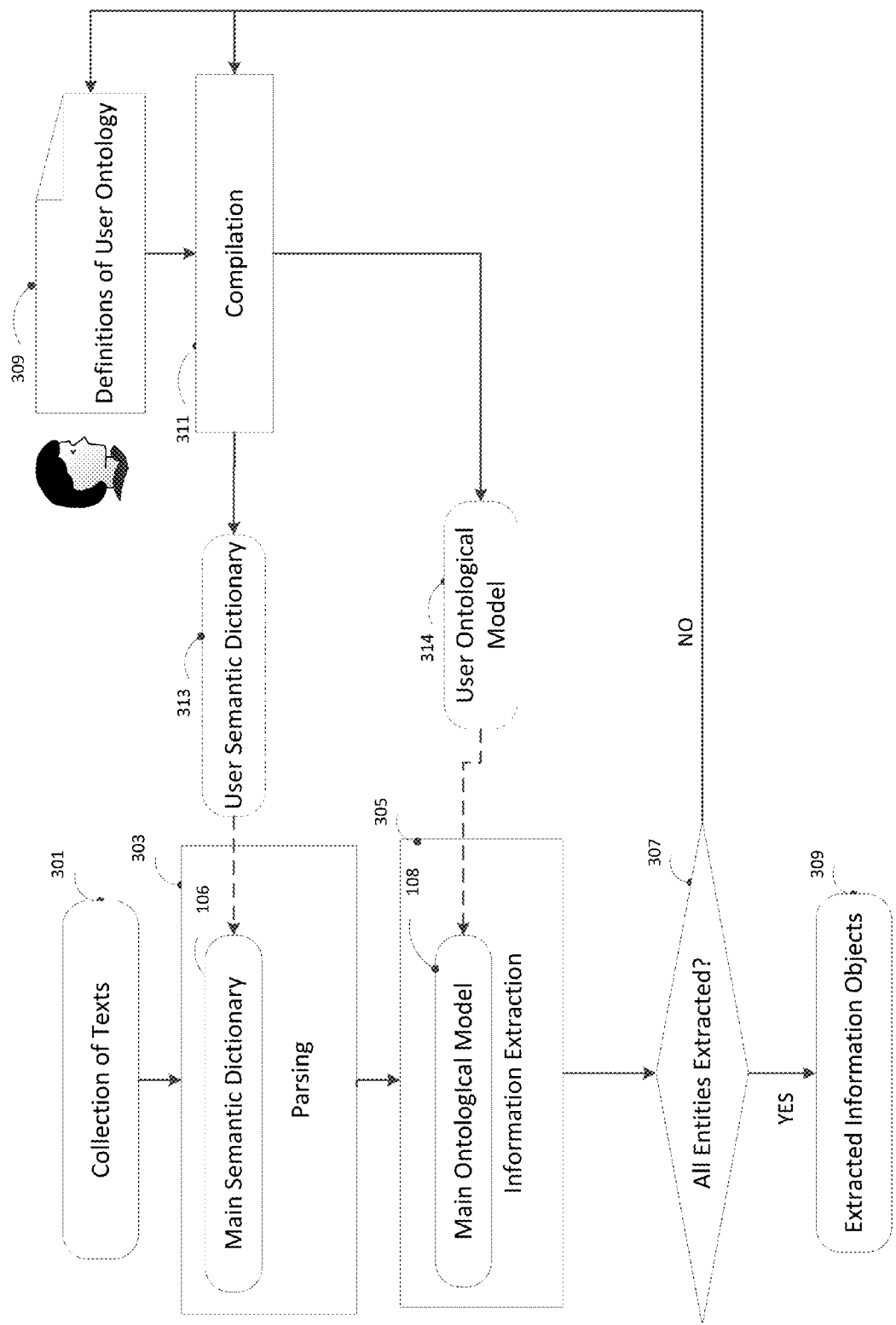
FIG. 3 illustrates an example method for using user ontological model in accordance with one example aspect.

FIG. 3 illustrates an example method for using user ontological model according to one example aspect. The block diagram shows that the user ontological model are created after the first step of semantic-syntactic analysis (303) and information extraction (305) has been done, using only the main semantic dictionary (106) and the main ontological model (108), respectively. The results of the working of the extraction module may be inaccurate, as witnessed by the fact that not all objects are extracted from the text (307). After this, the user creates a description of the user ontology (309), which is compiled (311), thereby creating a user ontological model (314) and a user semantic dictionary (313), which are incorporated into the main ontological model (108) and the main semantic dictionary (106). The semantic-syntactic analysis (303) using the user semantic dictionary (313) and the ontological analysis (305) using the expanded ontological model (108, 314) becomes more precise. In step 305, objects are extracted that were not extracted before.

Semantic-syntactic analysis (FIG. 1A, 111) may be performed on each sentence of the document, text, or corpus of user-provided texts (109). The semantic-syntactic analysis is done using the user semantic dictionary (105) which was compiled in step 152 and incorporated into the existing main semantic dictionary (106) of the system. The system input 109 can receive not only texts in editable format, but also their images obtained by scanning or photography. An additional step of preliminary processing of the obtained images into text format is then added, for example, by the use of optical (or intelligent) character recognition (OCR/ICR). Another preliminary step is added in the case of working with speech or audio files—a speech recognition step.

Figure 2:
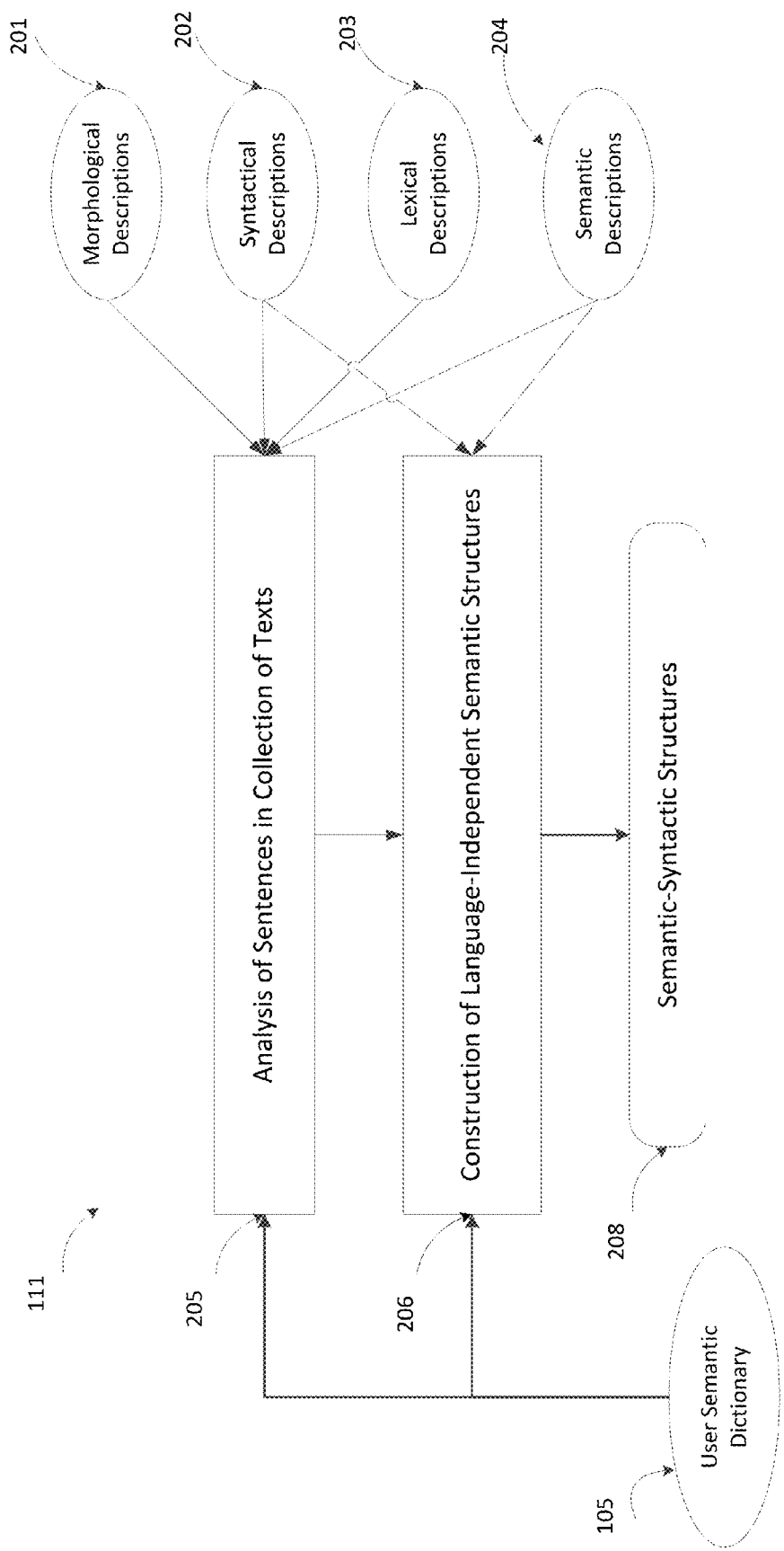
FIG. 2 illustrates an example method of performing a semantic-syntactic analysis in accordance with one example aspect.

FIG. 2 illustrates a general scheme of a method of deep syntactic and semantic analysis (FIG. 1A, 111) of texts in natural languages 109, based on linguistic descriptions. The method is presented in detail in U.S. Pat. No. 8,078,450, which in its entirety is incorporated by reference herein. The method uses a broad array of linguistic descriptions as universal semantic mechanisms. These analysis methods are based on the principles of comprehensive and targeted recognition, i.e., hypotheses as to the structure of part of a sentence are verified in the context of checking the hypothesis as to the structure of the entire sentence. This makes it possible to avoid the analysis of a large number of variants.

The deep analysis includes lexical-morphological, syntactic and semantic analysis of each sentence of the corpus of texts, resulting in the construction of language-independent semantic structures, in which each word of the text is paired with a corresponding semantic class (SC) from the universal semantic hierarchy (SH). An important fact is that the user semantic dictionary together with the main semantic dictionary (FIG. 2, 105) is used during all of the aforementioned steps of the sentence analysis (205, 206).

The source sentences in the text or collection of texts (109) are subjected to semantic-syntactic analysis 205 with the use of linguistic descriptions of both the source language and universal semantic descriptions, which lets us analyze not only the surface syntactic structure but also identify the deep semantic structure, expressing the meaning of the statement contained in each sentence, and also the relations between the sentences or fragments of text. The linguistic descriptions may include lexical descriptions 203, morphological descriptions 201, syntactic descriptions 202 and semantic descriptions 204. The analysis 205 includes a syntactic analysis carried out in the form of a two-stage algorithm (rough syntactic analysis and precise syntactic analysis), using the linguistic models and information of various levels to calculate the probabilities and generate a set of syntactic structures. As a result of this, in step 206 one constructs the semantic-syntactic structure (208). The user semantic dictionary is used with the main semantic dictionary at the stage of the deep analysis of a sentence (205) and at the stage of construction of semantic-syntactic structures (trees) of a sentence (206), wherein the semantic-syntactic trees comprise plurality of nodes.

The deep analysis (FIG. 1A, 111) of the text or collection of texts (109) starts with identification of the morphological meanings of the words of the sentence. The sentence is parsed into lexical elements, after which their potential lemmas are determined (initial or final forms), along with corresponding variants of the grammatical meanings. Usually, for each element one identifies a set of variants due to homonymy and coinciding word forms with different grammatical meanings.

One then identifies the lexical meanings of the elements of the sentence. The majority of natural language processing systems are based on a statistical approach and usually one selects as the most likely either the most frequent lexical variant or the most suitable one according to the results of preliminary training on corpora of text allowing for context. The lexical selection in the method of the present example aspects is done in consideration of many factors—the applicability of syntactic models of each of the possible lexical meanings in the given sentence, the pragmatic characteristics of each lexical meaning, the pragmatic characteristics of the context, the themes of the text and the corpus as a whole, a priori and statistical estimates of both the lexical meanings and the surface and deep slots.

In the general case, the lexical selection is preceded by a syntactic analysis. This involves the initialization of syntactic models of one or more potential lexical meanings of the particular word and establishing all potential surface slots in the sentence, which is reflected in the construction of a data structure known as the graph of generalized constituents. Next, from the graph of generalized constituents is formed at least one data structure which is a syntactic tree structure of the sentence. The necessary non-tree connections are also established. This process is described in the U.S. Pat. No. 8,078,450, which is incorporate by reference herein in its entirety. In the general case, one forms several such structures, due first and foremost to the presence of different variants for the lexical selection, and also the possibility of using different models. Each variant of the syntactic structure is given its own evaluation, and the structures are arranged in order from the most probable to the less probable.

A conditional probabilistic lexical selection is possible as one variant, in which different hypotheses as to the lexical meanings can be considered, and then a certain probability will be assigned to each hypothesis, and these several variants will be handed off in parallel to the next step.

Next, one determines the semantic meanings of the elements of the sentence. Each lexical meaning is matched up with its semantic class, and also a group of semantic and differential lexical and grammatical properties. On the basis of each syntactic structure of the sentence, one constructs a data structure known as a semantic structure of a sentence. In one example aspect, the semantic structure of a sentence at first is constructed for the best hypothesis (having a higher integral estimate). As a rule, the semantic structure of a sentence is a graph structure with a distinct vertex. At the nodes of this structure are found the semantic meanings, while its branches constitute the underlying semantic relations.

The user semantic dictionary is also used. As was described above, a source sentence from the text may be divided into a number of lexems, elements, or units, including all words, gaps, spacers, punctuators, etc., present in the source sentence, and used for building a lexical structure of the sentence. A lexeme is a meaningful linguistic unit that is an item in the vocabulary, such as lexical descriptions 103 of a language. To each unit in the divided sentence the morphological module (with morphological descriptions) is applied. This morphological module may identify all units (or words) that are known by the system. If the unit (word) is known to the system, a lexem for the unit's (or word's) initial form is identified.

If the unit (word) is unknown to the morphological module and is absent from the main semantic dictionary (for example, this word was introduced into the system by a user in the definition of the user ontology (101)), than the process of pseudolemmatization is performed. The process of pseudolemmatization may be performed by any well-known method. The process of pseudolemmatization comprises dividing a unit (word) into possible lemmas and generating possible variants of word inflexions. If one of these generated word inflexion variants matches a natural language string in the source text of the sentence, the user lexical class from user semantic dictionary is attributed to this unit (word) in the sentence.

Figure 4:
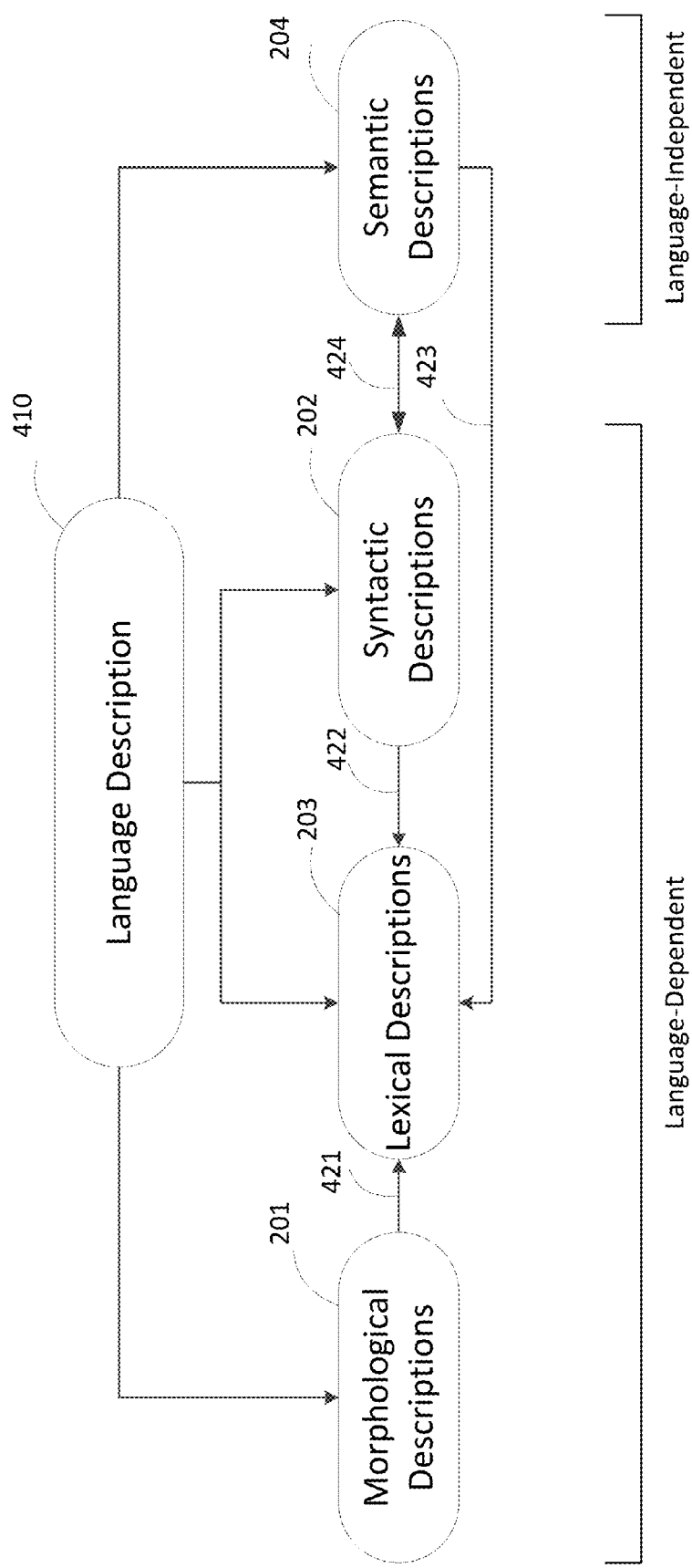
FIG. 4 illustrates an example of language descriptions in accordance with one example aspect.

During all stages of the described method one may use a broad array of linguistic descriptions. A group of said linguistic descriptions and individual stages of the method are described in detail below. FIG. 4 is a diagram illustrating language descriptions (410) according to one example aspect. The language descriptions (410) include morphological descriptions (201), syntactic descriptions (202), lexical descriptions (203) and semantic descriptions (204), as well as the relations between them. The morphological descriptions (201), lexical descriptions (203) and syntactic descriptions (202) are created for each language according to defined patterns. Each of these language descriptions (410) can be created for each source language, and all of them together constitute a model of the source language. However, the semantic descriptions (204) are universal, being used to describe the semantic properties of different languages that are independent of language and to construct semantic structures that are independent of language.

The lexical descriptions (203) and morphological descriptions (201) are related, since any lexical meaning in a lexical description (203) can have a morphological model in the form of one or more grammatical values for that lexical meaning. Furthermore, as shown by the relation (422), any lexical meaning in the lexical descriptions (203) can also have one or more surface models, corresponding to the syntactic descriptions (202) for that lexical meaning. As shown by the relation (423), the lexical descriptions (203) are related to the semantic descriptions (204) to form a main semantic dictionary. The key feature of the proposed example aspects is the fact that this main semantic dictionary 106 can be expanded with a user semantic dictionary (105). The expanded semantic dictionary (which contains both the main dictionary (106) and the user (105) semantic dictionary) enables a more accurate semantic-syntactic analysis.

Figure 5:
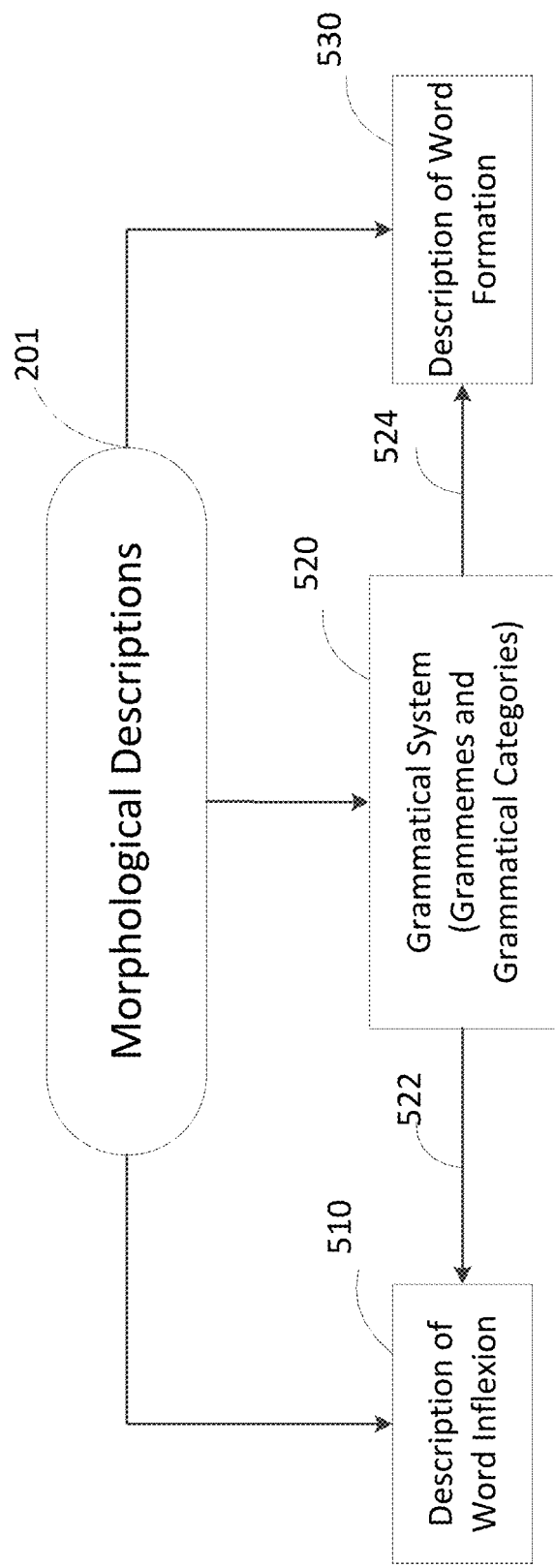
FIG. 5 illustrates an example of morphological descriptions in accordance with one example aspect.

FIG. 5 shows examples of the morphological descriptions (201). The constituents of the morphological descriptions (201) include: inflections of words (510), grammatical structure (520) (including grammemes) and descriptions of word formation (530) and so on. Grammemes are units of grammatical systems (520) and, as shown by relation (522) and relation (524), grammemes can be used to construct a description of word inflection (510) and a description of word formation (530).

According to one example aspect, models of constituents are used to establish syntactic relations between the elements of the source sentence. A constituent may contain a group of adjacent words in the sentence which behave as a single whole. The core of the constituent is a word; it can also contain filial constituents on lower levels. A filial constituent is a dependent constituent, it can be attached to other constituents (acting as parent constituents) to construct a syntactic description (202) of the source sentence.

Figure 6:
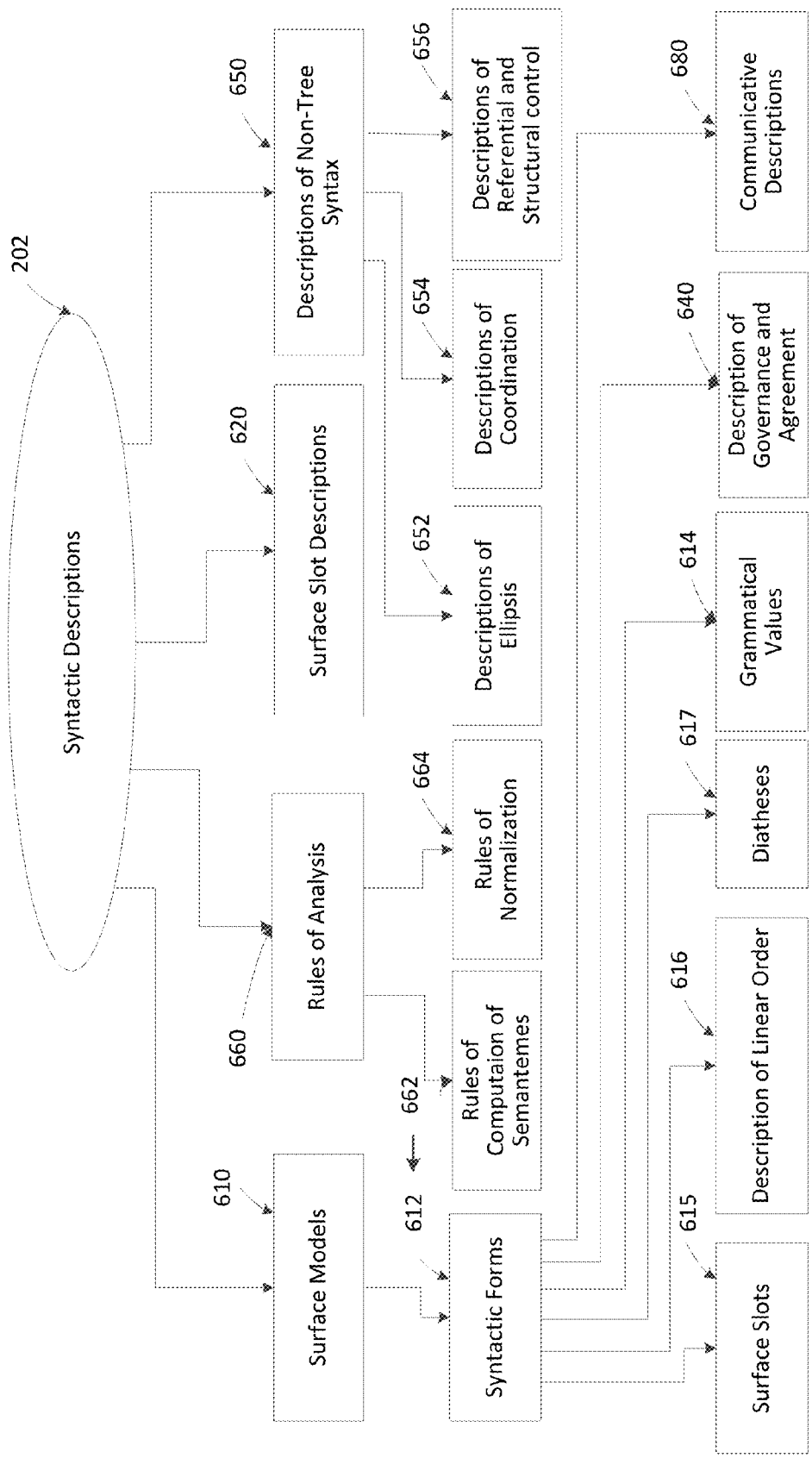
FIG. 6 illustrates an example of syntactic descriptions in accordance with one example aspect.

FIG. 6 shows examples of syntactic descriptions. The syntactic descriptions 202 are used to construct possible syntactic structures of the source sentence in the particular source language allowing for a free linear order of words, non-tree syntactic phenomena (such as coordination, ellipsis, and so on), referential relations and other considerations. The components of syntactic descriptions (202) may include: surface models (610), descriptions of surface slots (620), referential descriptions and descriptions of structural control (630), descriptions of governance and agreement (640), a description of non-tree syntax (650) and rules of analysis (660). Surface models (610) are in the form of a set of syntactic forms (612) describing possible syntactic structures of sentences included in the syntactic description (202). On the whole, any given lexical meaning in the language is linked to surface (syntactic) models (610), which are possible constituents in the event that this lexical meaning plays the role of a "core" and includes a set of surface slots of subsidiary elements, a description of linear order, diathesis, and so on. The surface models (610) are represented by syntactic forms (612). Each syntactic form (612) can include a certain lexical meaning, which plays the part of a "core", and it can additionally include a set of surface slots (615) of its filial constituents, a description of linear order (616), diathesis (617), grammatical meanings (614), descriptions of governance and agreement (640), communicative descriptions 680 and so on, related to the core of the constituent. Descriptions of surface slots (620) in the syntactic descriptions (202) are used to describe common features of surface slots (615), which are used in the surface models (610) of different lexical meanings in the source language. The surface slots (615) are used to express syntactic relations between the constituents of a sentence. Examples of surface slots (615) may include "Subject", "Object_Direct", "Object_Indirect", "Relative Clause", and so on.

In the course of the syntactic analysis, the model of constituents utilizes a set of surface slots (615) of the filial constituents and descriptions of their linear order (616); this describes the grammatical values (614) of the possible contents of these surface slots (615). Diathesis (617) represents the correspondences between the surface slots (415) and the deep slots (714) (as shown in FIG. 7). The communicative descriptions (680) describe the communicative order in the sentence.

The syntactic forms (612) constitute a collection of surface slots (615) related to the descriptions of linear order (616). One or more constituents which can be constructed for the lexical meaning of a word form of the source sentence can be represented by surface syntactic models, such as the surface models (610). Each constituent is examined as a realization of the model of constituents by selecting an appropriate syntactic form (612). The selected syntactic forms (612) constitute sets of surface slots (615) with a given linear order. Each surface slot in the syntactic form can have grammatical and semantic restrictions on its contents.

The description of linear order (616) is in the form of expressions of linear order constructed in order to express the sequence in which different surface slots (615) can occur in the sentence. The expressions of linear order may include the names of variables, the names of surface slots, round brackets, grammemes, evaluations, the "or" operator, and so on. For example, the description of linear order for the simple sentence "Boys play football" can be presented in the form "Subject Core Object_Direct", where "Subject", "Core" and "Object_Direct" are the names of surface slots (615) corresponding to the order of the words.

Different surface slots (615) may be present in a syntactic form (612) in a relation of strict and/or non-strict order.

Communicative descriptions (680) describe the order of words in a syntactic form (612) from the standpoint of communicative acts in the form of communicative expressions of order, which are similar to the expressions of linear order. The description of governance and agreement (640) contains rules and restrictions on the grammatical meanings of attached constituents which are used during the syntactic analysis.

Non-tree syntactic descriptions (650) may be used in the processing of various language phenomena, such as ellipsis and agreement; they are used in transformations of syntactic structures which are created in various stages of the analysis in different example aspects. Non-tree syntactic descriptions (650) include the description of ellipsis (652), the description of coordination (654), and also the description of referential and structural control (630).

The rules of analysis (660) as part of the syntactic descriptions (202) may include: rules for computation of semantemes (662) and rules for normalization (664). Even though the rules of analysis (660) are used at the stage of semantic analysis, the rules of analysis (660) describe properties of a specific language, being related to the syntactic descriptions (202). The rules of normalization (664) are used as rules of transformation to describe transformations of the semantic structures which may differ in different languages.

FIG. 7 presents an example illustrating the semantic descriptions. The components of the semantic descriptions (204) do not depend on the language; they may include: semantic hierarchy (710), descriptions of deep slots (720), the system of semantemes (730) and pragmatic descriptions (740).

Each semantic class in the semantic hierarchy (710) is accompanied by a deep model (712). The deep model (712) of a semantic class is a group of deep slots (714) which reflect the semantic roles of the filial constituents in different sentences with the objects of the semantic class acting as the core of the filial constituent, and also the possible semantic classes acting as content of the deep slots. The deep slots (714) express semantic relations, including "agent", "recipient", "instrument", "quantity", and so on. A filial semantic class inherits and clarifies the deep model (712) of its parent semantic class.

The descriptions of deep slots (720) are used to describe common properties of the deep slots (714), and they reflect the semantic roles of the filial constituents in the deep models (712). The descriptions of deep slots (720) also contain grammatical and semantic restrictions on the contents of the deep slots (714). The properties and restrictions of the deep slots (714) and their possible contents are very similar, often being identical in different languages. Thus, the deep slots (714) are not dependent on language.

The system of semantemes (730) is a collection of semantic categories and semantemes representing the meanings of the semantic categories. As an example, the semantic category "DegreeOfComparison" can be used to describe the degree of comparison of adjectives, and its semantemes may be, for example, "Positive", "ComparativeHigherDegree", "SuperlativeHighestDegree", and so on.

The system of semantemes (730) includes semantic properties independent of language, expressing not only semantic characteristics but also stylistic, pragmatic and communicative characteristics. Some semantemes can be used for expression of atomic meaning, which finds regular grammatical and/or lexical expression in the language. In terms of purpose and use, the system of semantemes (730) can be broken up into different forms, which include: grammatical semantemes (732), lexical semantemes (734) and classifying grammatical (differentiating) semantemes (736).

Grammatical semantemes (732) are used to describe the grammatical properties of constituents upon transformation of a syntax tree into a semantic structure. Lexical semantemes (734) describe specific properties of objects (such as "being flat" or "being liquid"), they are used in descriptions of deep slots (720) as a restriction on the contents of the deep slots (for example, for the verbs "face (with)" and "flood", respectively). Classifying grammatical (differentiating) semantemes (736) express the differential properties of objects within the same semantic class.

A pragmatic description (740) allows the system to assign a corresponding theme, style or genre for the texts and objects of the semantic hierarchy (710).

Figure 8:
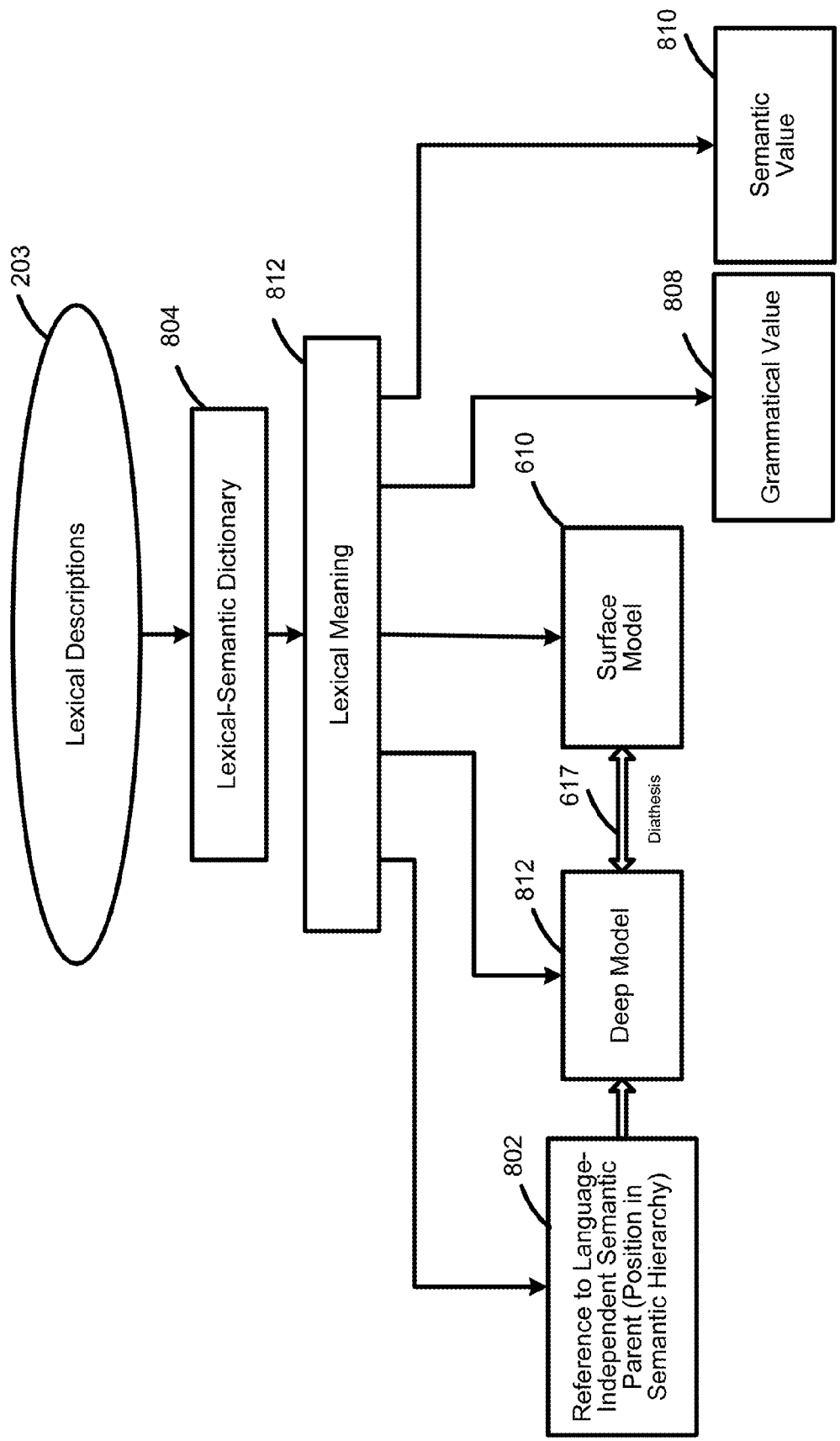
FIG. 8 illustrates an example of lexical descriptions in accordance with one example aspect.

FIG. 8 presents an illustrative example of lexical descriptions. The lexical descriptions (203) constitute a collection of lexical meanings (812) of a particular language for each component of a sentence. For each lexical meaning (812) one can establish a relation (802) with its language-independent semantic parent in order to indicate the position of a particular lexical meaning in the semantic hierarchy (710). A similar dependency is established in the user semantic dictionary for each term introduced, namely, a semantic class from the semantic hierarchy is assigned to each term of the user semantic dictionary 105.

Each lexical meaning (812) is connected to its own deep model (712), which is described by language-independent terms, and to a surface model (610), which is dependent on the language. Diathesis can be used as an interface between the surface models (610) and the deep models (712) for each lexical meaning (612). Each surface slot (615) in each syntactic form (612) of a surface model (610) can be matched up with one or more diatheses (617).

While the surface model (610) describes the syntactic roles of the contents of the surface slots, the deep model (712) usually describes their semantic roles. The description of a deep slot (720) expresses the semantic type of the possible content and reflects the real aspects of situations, properties or attributes of objects designated by the words of any given natural language. Each description of a deep slot (720) is independent of the language, since the identical deep slot is used in different languages to describe similar semantic relations or express similar aspects of situations and the contents of deep slots (714) generally possess the same semantic properties even in different languages. Each lexical meaning (812) of a lexical description of a language inherits the semantic class of its parent and clarifies its deep model (712).

Furthermore, the lexical meanings (812) can contain their own particular characteristics, and they can even inherit other characteristics from the parent semantic class. These characteristics of lexical meanings (812) include grammatical meanings (808), which can be expressed in the form of grammemes, and semantic meaning (810), which can be expressed in the form of semantemes.

Each surface model (610) of a lexical meaning includes one or more syntactic forms (612). Each syntactic form (612) of a surface model (610) can include one or more surface slots (615) with their own descriptions of linear order (616), one or more grammatical meanings (614), expressed in the form of a collection of grammatical characteristics (grammemes), one or more semantic restrictions on the contents of the surface slots, and one or more diatheses (617). The semantic restrictions on the content of a surface slot represent a collection of semantic classes whose objects can occupy that surface slot. Diatheses (617) are part of the relations (424) between syntactic descriptions (202) and semantic descriptions (204), they reflect correspondences between surface slots (615) and deep slots (714) of the deep model (712).

In order to determine the lexical meanings, each sentence in the source language is subjected to parsing in accordance with the technology of semantic-syntactic analysis as described in detail in the U.S. Pat. No. 8,078,450, which is incorporated by reference herein in its entirety. This technology uses all of the mentioned linguistic descriptions (210), including morphological descriptions (201), lexical descriptions (203), syntactic descriptions (202) and semantic descriptions (204).

Figure 9:
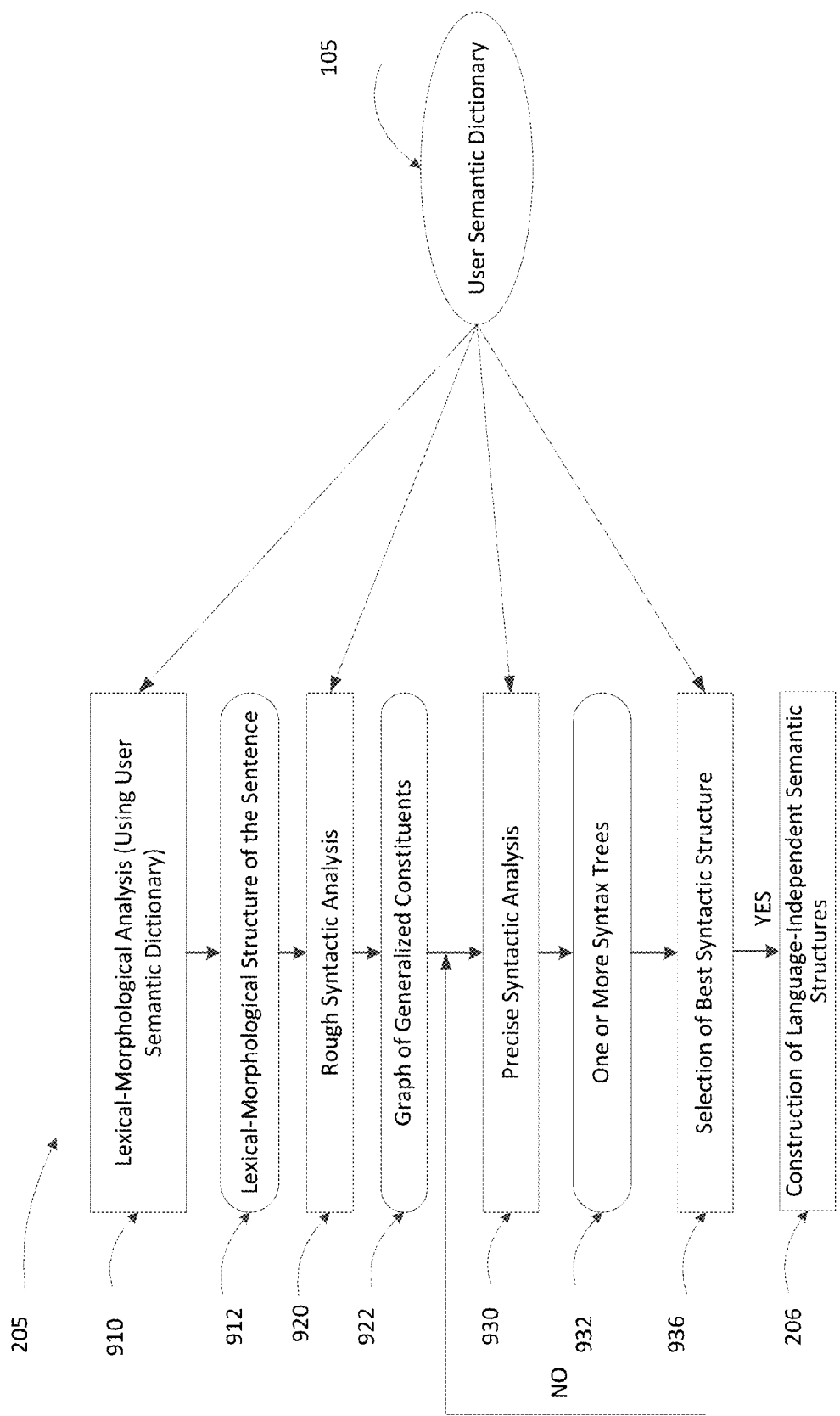
FIG. 9 illustrates an example method of the deep analysis of a sentence in accordance with one example aspect.

FIG. 9 shows the stages of this method, including the sequence of data structures which are constructed in the course of the analysis. The user semantic dictionary along with the main semantic dictionary is used in all stages of the analysis of a sentence (910, 920, 930, 936, FIG. 9). As a preliminary step, the source sentence 200 in the source language is subjected to lexical-morphological analysis 910 to construct the lexical-morphological structure (912) of the source sentence. The lexical-morphological analysis is done with the use of both the main semantic dictionary and the user semantic dictionary. The lexical-morphological structure (912) constitutes a group of all possible pairs of lexical meaning/grammatical meaning for each lexical element (word) in the sentence.

Next, the first stage of the syntactic analysis is carried out on the lexical-morphological structure—a rough syntactic analysis (920) of the source sentence to construct the graph of generalized constituents (922). In the course of the rough syntactic analysis (920), all possible syntactic models of possible lexical meanings are applied to each element of the lexical-morphological structure (912) and these are verified in order to find all potential syntactic links in this sentence as reflected in the graph of generalized constituents (922).

The graph of generalized constituents (922) is an acyclic graph, whose nodes are the generalized (that is, preserving all variants) lexical meanings of the words in the sentence, while the branches are the surface (syntactic) items expressing the different types of relations between the generalized lexical meanings. All possible surface syntactic models are verified for each element of the lexical-morphological structure of the sentence as a potential core for the constituents. After this, all possible constituents are constructed and generalized in the graph of generalized constituents (922). Accordingly, all possible syntactic models and syntactic structures of the source sentence (200) are examined, and as a result the graph of generalized constituents (922) is constructed on the basis of the set of generalized constituents. The graph of generalized constituents (922) at the level of the surface model reflects all potential links between the words of the source sentence (200). Since the number of variations of the syntactic parsing in a general case is large, the graph of generalized constituents (922) is redundant: it has a large number of variations both in regard to the choice of lexical meaning for the vertex and in regard to the choice of surface slots for the branches of the graph.

For each pair of lexical meaning/grammatical meaning one initializes its surface model; other constituents to the right and left are added in the surface slots (615) of the syntactic form (612) of its surface model (610) and adjacent constituents. The syntactic descriptions are shown in FIG. 6. If a corresponding syntactic form is found in the surface model (610) for the corresponding lexical meaning, the selected lexical meaning can be used as the core of a new component.

The graph of generalized constituents (922) is originally constructed in the form of a tree, starting from the leaves and moving toward the root (from the bottom up). Additional components are obtained from the bottom up by adding filial components to the parent constituents; these fill in the surface slots (615) of the parent constituents in order to encompass all original lexical units of the source sentence.

As a rule, the root of the tree, which is the principal vertex of the graph (922), is a predicate. In the course of this process, the tree usually becomes a graph, since the constituents of lower level can be incorporated into several constituents of higher level. Several constituents constructed for the identical elements of the lexical-morphological structure can afterwards be generalized to produce generalized constituents. The constituents are generalized on the basis of lexical meanings or grammatical meanings (614), for example, based on the parts of speech and the relations between them.

A precise syntactic analysis (930) is done to distinguish the syntax tree (932) from the graph of generalized constituents (922). One syntax tree or several syntax trees will be constructed, and for each of them one calculates a general estimate on the basis of using a set of a priori and calculable estimates, and then the tree with the best estimate is selected to construct the best syntactic structure (946) of the source sentence.

Syntax trees are formed in the course of the advancement and checking of hypotheses as to the possible syntactic structure of the sentence; in this process, hypotheses as to the structure of parts of the sentence are formed in the context of the hypothesis as to the structure of the entire sentence.

In the process of moving from the selected syntax tree to the syntactic structure (936), non-tree links are established. If non-treelike links cannot be established, one selects the syntax tree having the next highest rating, and attempts to establish non-tree links in it. The result of the precise analysis (930) is an improved syntactic structure (946) of the sentence being analyzed. In fact, by selecting the best syntactic structure (936) one is also making a lexical selection, i.e., a determination of the lexical meanings of the elements of the sentence.

Next, one constructs a language-independent structure (206 FIG. 9, 206 FIG. 2), which reflects the meaning of the sentence on the basis of universal concepts, not dependent on language. The language-independent semantic structure of the sentence (206) is in the form of an acyclic graph (trees supplemented with non-tree links), with all words in the particular language being replaced by universal (language-independent) semantic entities, called in this document "semantic classes". This transition is done with the aid of the semantic descriptions (204) and rules of analysis (660), as a result of which one gets a structure in the form of a graph with a principal vertex, where the nodes represent semantic classes, accompanied by groups of properties (the properties express the lexical, syntactic and semantic qualities of the particular words of the source sentence), while the branches represent the underlying (semantic) relations between those words (nodes) which they interconnect.

Let us turn to FIG. 1A; in step 113 the processor extracts information from the text data by using the main ontological model 108, expanded with the user ontological model 107. The information extraction routine is an automated machine extraction of information objects (entities, facts) by processing unstructured electronic documents (texts or collections of texts 109). In one example aspect, the information extraction module 113 carries out a method by using the results of the deep semantic-syntactic analysis (111, FIG. 1, FIG. 2, FIG. 9), resulting in creation of a set of semantic-syntactic trees (208), and also by using ontological rules 131 (rules for extracting information) that are created manually. The ontological rules (131) of the main ontological model (FIG. 1A, 108) describe how the entities and facts are expressed in the texts.

Using the results of the preliminary semantic-syntactic analysis of texts 111 (FIG. 9) the ontological rules 131 are generated and used directly on structured data, namely, in deep (semantic) structures or trees, allowing for the lexical, syntactic and semantic properties obtained in the preceding stage 111 during the preliminary semantic-syntactic parsing.

Thus, in step 113 (FIG. 1A), the information extraction module receives at its input the semantic-syntactic trees (FIG. 2, FIG. 9, 208) obtained as a result of the work of the parser 111. The semantic-syntactic trees comprise plurality of connected nodes. The nodes of the semantic-syntactical tree correspond to the words from the sentence and contain information about corresponding particular lexical class from the semantic dictionary. In addition to this, the nodes contain grammatical and semantic information about the language (sets of grammemes and semantemes), characterizing specific use of the corresponding word in the context of the sentence. The arcs of the semantic-syntactical trees represent the deep slots (i.e., semantic role of the dependent word, such as Agent) and the surface slots (i.e., syntactical function of the dependent word, such as $Subject). In conducting the semantic-syntactic analysis of the sentence, the user semantic dictionary 105 is used in addition to the main semantic dictionary 106. Nodes of the semantic syntactic tree may have an identifier of user instance from generated user ontological model or reference to a structure (for example lexical or semantic classes) comprising the identifier of the user instance structure. This identifier is used for extraction of information objects that are based on user instance in user ontological model.

The semantic-syntactic trees can be further processed. For example, there can be processing of ellipsis, and addition of non-tree links from compound constituents, and so on. To the results of the preprocessing of the semantic-syntactic parsing, one applies a set of information extraction rules (ontological rules) grouped and ordered at the time of compiling the description of the subject domain (expanded ontological model) on the basis of information about the dependencies between the rules. As a result of the working of the information extraction module, an oriented graph is constructed, whose nodes represent the information objects of the different classes, while the lines describe the links between the information objects.

The semantic-syntactic trees are processed by information extraction module 113. Extraction (ontological) rules are applied to semantic-syntactic trees to extract information. Extraction rules are created manually. Each semantic-syntactic tree is analyzed to identify a sub-tree or a fragment of the semantic-syntactic tree which is matched with a pattern of nodes from the extraction rules.

The interpreter of the information extraction rules: the left-hand side (or condition side) of a rule in the system may contain the so-called object conditions, which imply that an information object of a certain type must be assigned to a certain parse tree node for the successful application of the rule. If such an object is found, it can be accessed and modified during the application of the right-hand side of the rule.

Extraction rules allow to determine the property of the extracted information objects and the value of this property.

It is presumed that certain properties are intrinsic to the information objects. The attributes of an information object can be specified, for example, with an object-property-value triplet <s, p, o>, where s denotes a unique identifier of the object, p is the identifier of a property (predicate), and o is a value of simple type (string, numeral, and so on).

Information objects can be connected to each other by object properties or links. An object property is specified with the help of the object-property-value triplet <s, p, õ>, where s is a unique identifier of the object, p is an identifier of the relationship (predicate), and õ is a unique identifier of another object.

The information extracted from the text can be represented in accordance with the RDF (Resource Definition Framework) convention. As has already been mentioned above, a system of ontological rules is used in the information extraction process. These ontological rules include patterns of nodes which, when matched with fragments of the semantic-syntactic tree, generate extracted information objects and the elements of the informational RDF of the graph.

The RDF graph generated by the information extraction module is matched up with the formal description of the subject domain, or ontologies. One advantage of this method is the use of an expanded ontological model (afterwards compiled with the information extraction rules into an ontological model) which includes user ontological models (107) in addition to the main ontological model (108) that store in themselves a description of the subject domain that is specific to the user. The information stored in the expanded ontological model along with the rules of information extraction makes it possible to extract objects which could not have been extracted without the use of the user ontologies, or would have been only partly extracted (in the case of multiple-word objects like "Kaiser Permanente"), or would have been extracted but in the form of other objects.

The creation of the user ontological model and the user semantic dictionary helps first and foremost avoid those situations where an entity is extracted incorrectly from a text. For example, in the sentence "Bloomberg, the global business and financial information and news leader, gives influential decision makers a critical edge by connecting them to a dynamic network of information, people and ideas" the results of the working of the semantic-syntactic analysis 111 (without use of the user semantic dictionary) and the information extraction module (without the use of the user ontological model) might extract the information object "Bloomberg" as a person, which is not true in view of the knowledge that "Bloomberg" is an organization. Therefore, after placing the corresponding user instance in the user ontological model with the indication that this user instance "Bloomberg" should be a descendant of the concept Organization (Org: Organization, Bloomberg_IndividualName, "Bloomberg"), "Bloomberg" is extracted as an organization from the indicated sentence.

Analysis without the use of the user semantic dictionary in the semantic-syntactic analysis and the user ontological model cannot extract information objects from text data with sufficient accuracy. Let us consider the example of a partial selection of an object from a text. In the sentence "The adjuster, working for Colonial Claims on behalf of Fidelity National Indemnity Insurance, estimated that the work on the floor joists would cost a mere $425, compared with the $2,927 projected by the contractor hired by the homeowners" the working of the semantic-syntactic analysis (without the use of the user semantic dictionary) and the information extraction module using ontological rules (without the use of the user ontological model) extracts out the organization Fidelity National instead of Fidelity National Indemnity Insurance.

After the user creates a user ontological model, entering into the list 101 a record of type
Org: Organization, Fidelity_National_Indemnity_Insurance_IndividualName, Fidelity National Indemnity Insurance the user organization will be extracted completely in the aforementioned sentence: Fidelity National Indemnity Insurance.

Figure 10A:
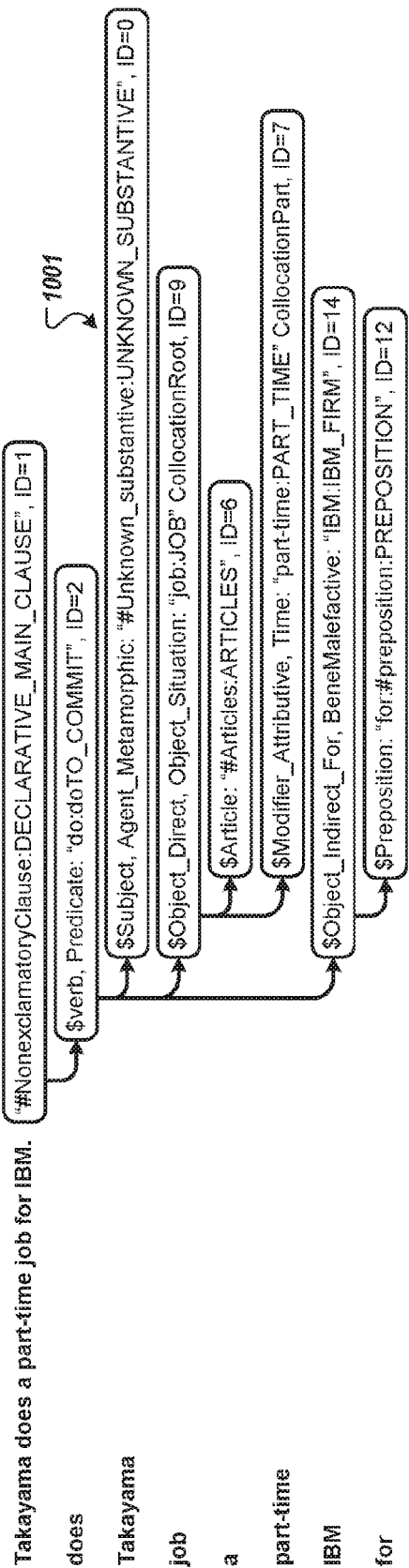
FIG. 10A illustrates a semantic-syntactic structure of a sentence obtained by the semantic-syntactic analysis in accordance with one example aspect.
Figure 11A:
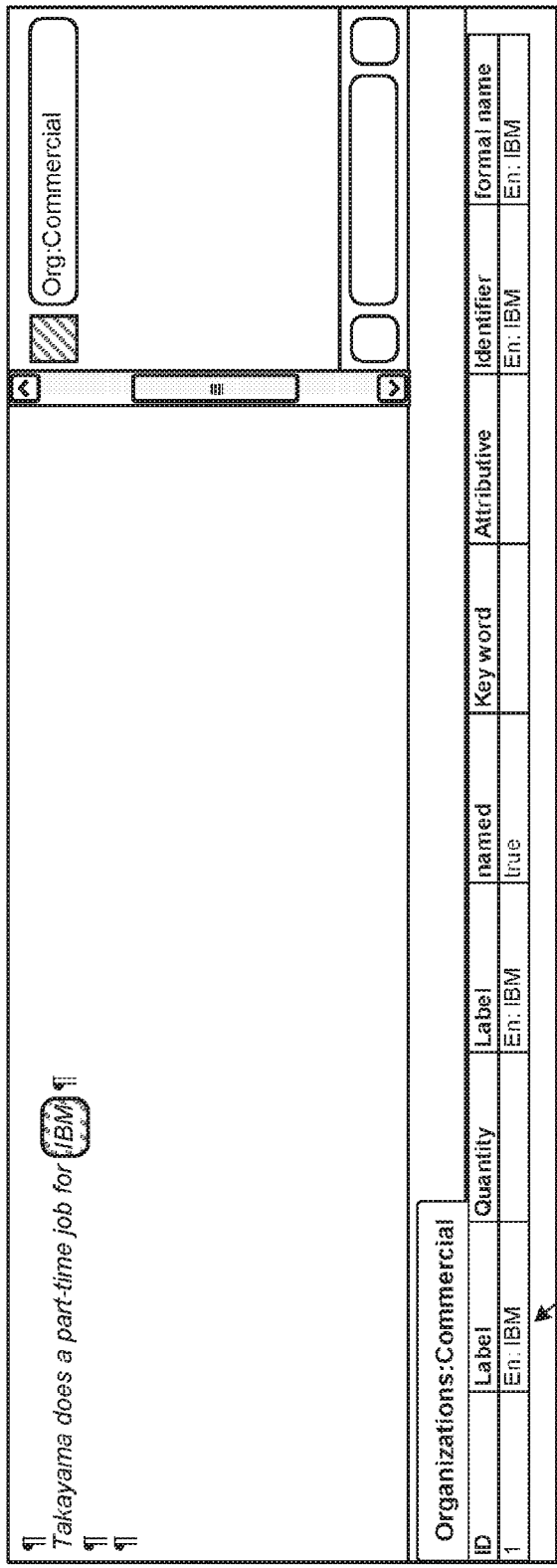
FIG. 11A illustrates the results of the working of the module for extraction of information without using a user ontological model and user semantic dictionary on the example sentence "Takayama does a part-time job for IBM."
Figure 11B:
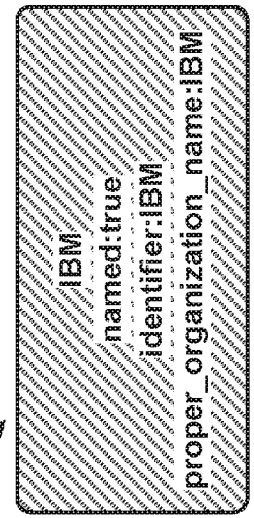
FIG. 11B illustrates the results of the working of the module for extraction of information without using a user ontological model and user semantic dictionary on the example sentence "Takayama does a part-time job for IBM."

In the analysis of the sentence "Takayama does a part-time job for IBM", analysis without the use of the user ontological model and user semantic dictionary did not extract the information object "Takayama". In fact, after performing the deep semantic-syntactic analysis (111) as described above, without the use of a user semantic dictionary, the semantic-syntactic structure shown in FIG. 10A was obtained for the first sentence. In FIG. 10A "Takayama" is assigned the semantic class UNKNOWN_SUBSTANTIVE (1001). That is, as a result of the working of the information extraction module 113, which received at its input the semantic-syntactic structure (FIG. 10A), without the use of user ontological model, the information object "Takayama" was not extracted. FIGS. 11A and 11B show the results of the working of the information extraction module for the sentence "Takayama does a part-time job for IBM". Only the information object "IBM" has been extracted (1101, 1102) as an information object.

Figure 10B:
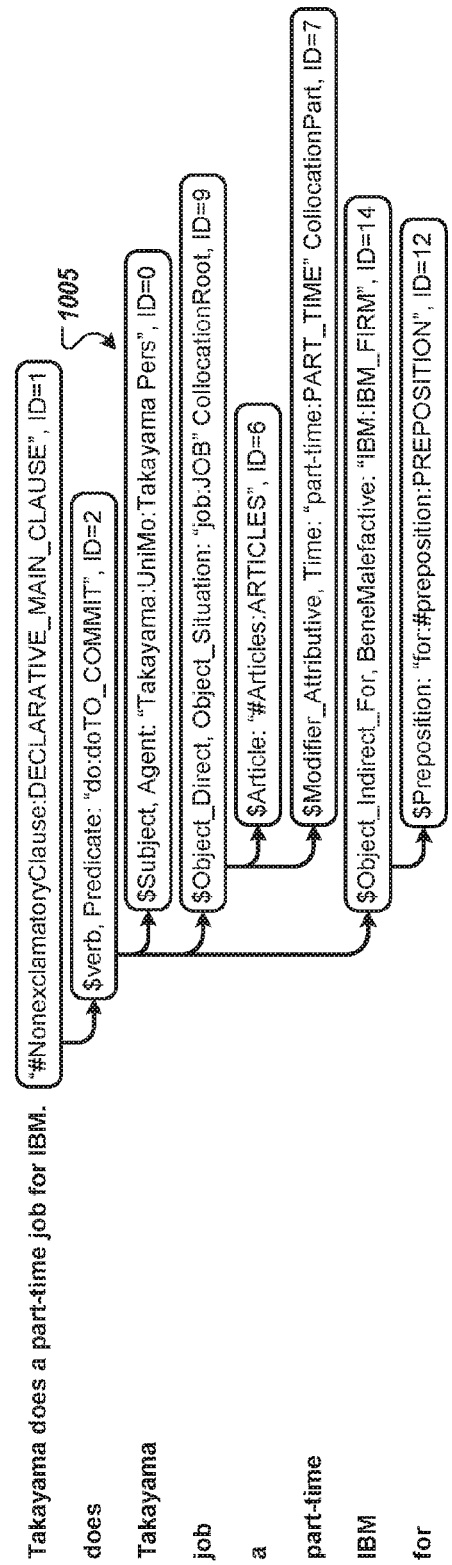
FIG. 10B illustrates semantic-syntactic structure of a sentence obtained by the semantic-syntactic analysis in accordance with another example aspect.

In FIGS. 10A and 10B, the words beginning with the dollar sign ($Verb, $Subject, etc.) represent surface slots. The words following the surface slots (Predicate, Agent, BeneMalefactive, etc.) represent deep slots.

Figure 12A:
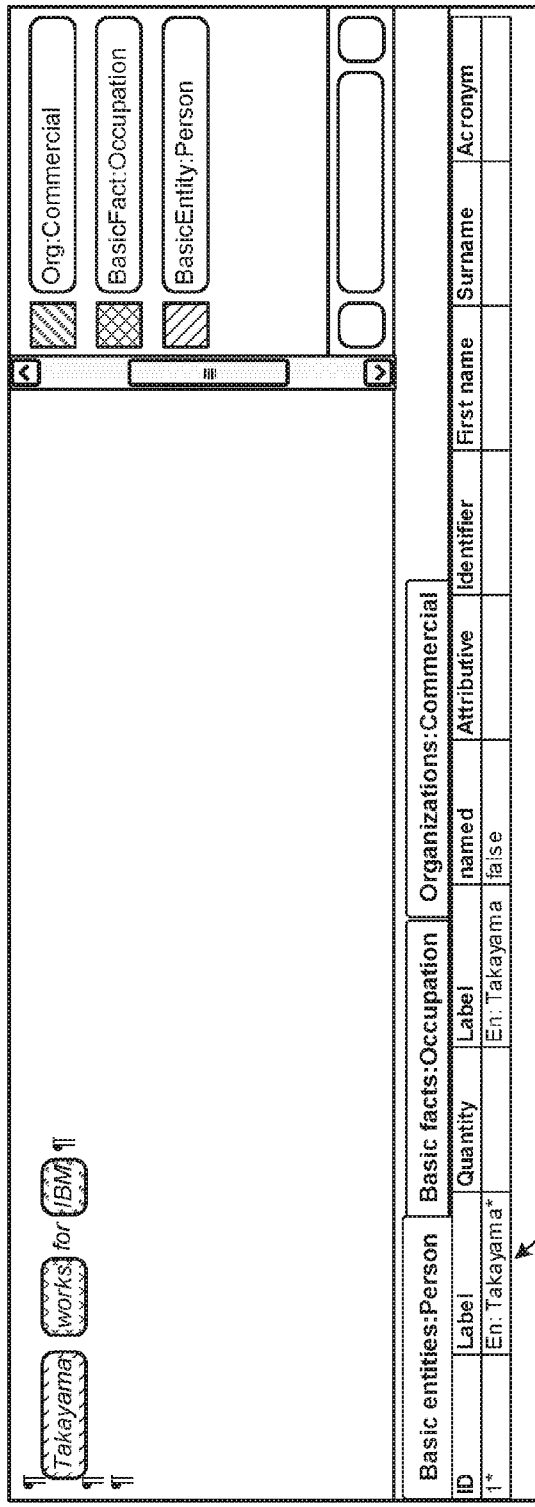
FIG. 12A illustrates the results of the working of the module for extraction of information using a user ontological model and user semantic dictionary on the example sentence "Takayama does a part-time job for IBM."
Figure 12B:
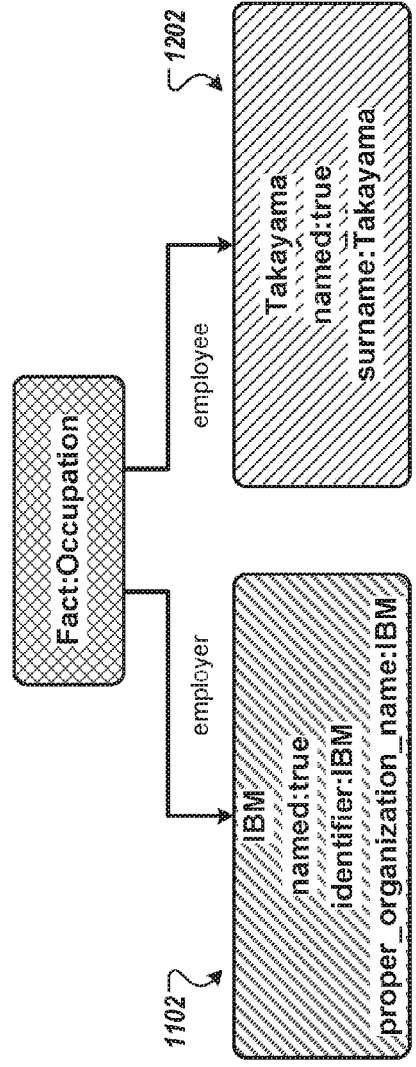
FIG. 12B illustrates the results of the working of the module for extraction of information using a user ontological model and user semantic dictionary on the example sentence "Takayama does a part-time job for IBM."

FIG. 10B shows the semantic-syntactic tree structure obtained as a result of an analysis using a user ontological model 107 and user semantic dictionary 105, compiled in step 103. "Takayama" has been assigned the user lexical class "Takayama" (1005). FIGS. 12A, 12B show the results of the working of the information extraction module using an expanded ontological model including user ontological model. Besides the information object "IBM" (1102), the information object "Takayama" has been extracted (1201, 1202) as an information object.

In addition to the examples given above, the use of the user ontologies makes it possible to handle homonyms. Homonyms are a phenomenon in language involving the existence of two or more words of different meaning, yet identical in sound or written form.

If an identical text fragment can denote different objects, such as "Takayama" can be a location (as in the sentence "His office is located in Takayama") and a person (in the sentence "Takayama does a part-time job for IBM"), the possibility exists in the context of the proposed example aspects to distinguish said objects for analysis tasks, that is, to insert two instances of different concepts with the identical text fragment in the definition of the user ontology (101).
For example, if only the location is inserted in the definition of the user ontology 101:
Geo: InhabitedLocality, Takayama_IndividualName, "Takayama"
then the location information object "Takayama" will be extracted from the sentence "His office is located in Takayama" as an information object.
In order for the information object "Takayama" to be extracted as an information object representing a person, the user must insert all homonymic objects in the list:
Be: Person, Takayama_IndividualName, "Takayama"
Geo: InhabitedLocality, Takayama_IndividualName, "Takayama"
Then the information object "Takayama" will be extracted as an information object representing a person from the source sentence "Takayama does a part-time job for IBM". The choice between location and person occurs on the basis of a context analysis during the semantic-syntactic analysis 111 and the ontological analysis.

Let us consider yet another example of source text in which the information object "Arakan" can be a person, an organization, and a location: "Takayama works in western Arakan". 113, If the user previously described the instance "Arakan" in the definition of the user ontology (101) as:
Geo: InhabitedLocality, Arakan_IndividualName, "Arakan"
Org: Organization, Arakan_IndividualName, "Arakan"
Be: Person, Arakan_IndividualName, "Arakan"
Then by virtue of considering the context during the semantic-syntactic analysis 111 of the source sentence the information object "Arakan" is extracted as an information object representing a location. In the present case, a competition will occur between the defined semantic classes for each instance, that is, the semantic classes corresponding to concepts Geo: InhabitedLocality, Org: Organization, and Be: Person. In the course of the competition, only one semantic class will win out in each specific example and the user instance which corresponds to this semantic class will be created. The choice of the semantic class will depend on the context and the results of selecting the best semantic-syntactic structure, based on the results of assigning various ratings in the process of the deep analysis, specifically, the possibility of combining these semantic classes and surface slots.

Figure 13:
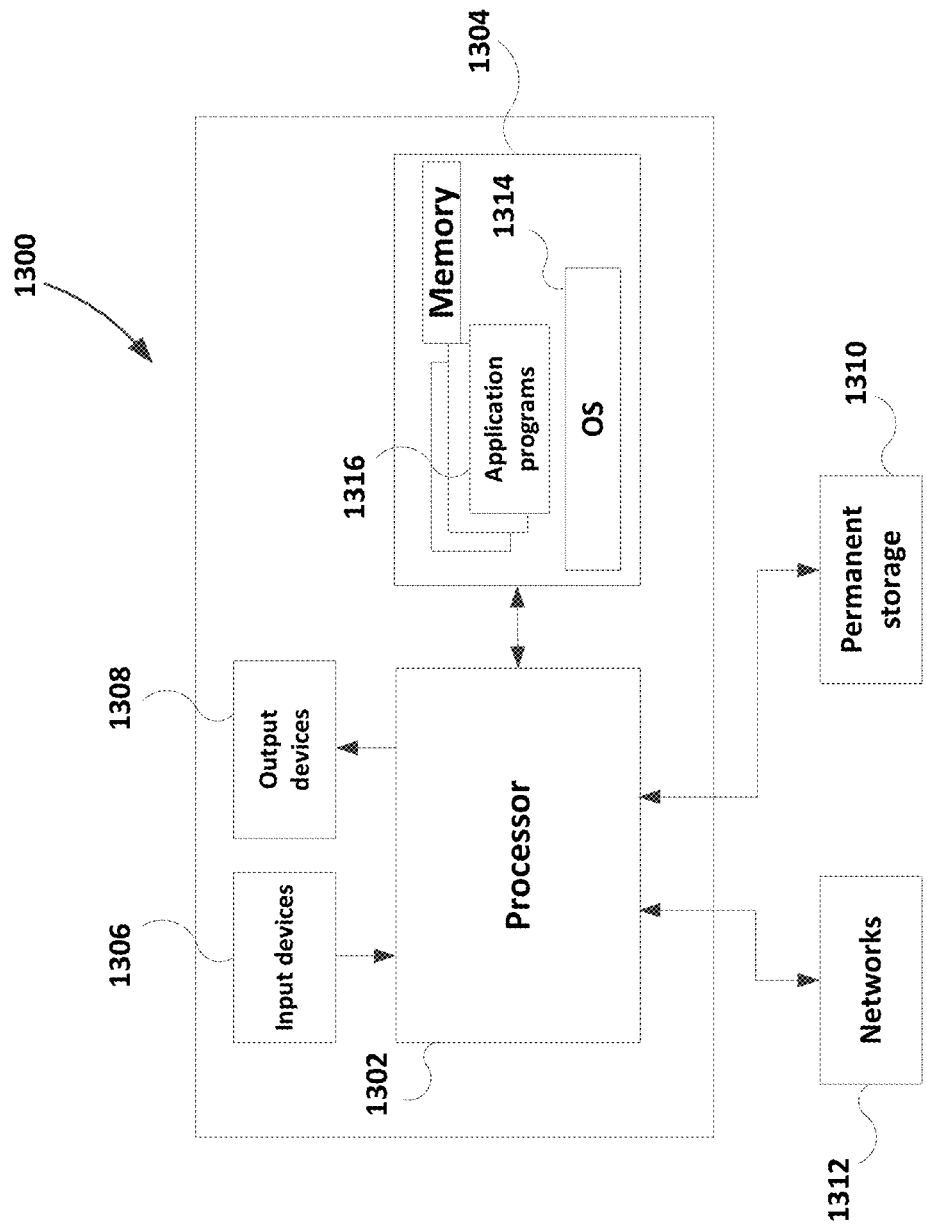
FIG. 13 illustrates a sample computer system, such as a server or personal computer, suitable for implementing systems and methods disclosed herein in accordance with example aspects.

FIG. 13 shows a diagram of a computer system (1300) which can be used to implement the present example aspects. The computer system (1300) may include at least one processor (1302) connected to a memory (1304). The term "processor" in the diagram (1302) can denote one or more processors with one or more computing kernels, a computing device, or any other CPU on the market. The symbol 1304 denotes a working storage (RAM), which is the main storage, and also additional memory levels—cache, power-independent, backup memory (such as programmable or flash memory), ROM, and so on. Furthermore, the term memory (1304) can also mean a storage residing in another part of the system (such as the cache of the processor (1302) or another storage used as virtual memory, such as an internal or external ROM (1310).

The computer system (1300) as a rule has a certain number of inputs and outputs for transmittal and receiving of information from the outside. The user or operator interface of the software (1316) can be one or more user entry devices (1306), such as keyboard, mouse, imaging device, etc., and also one or more output devices (liquid crystal or other display (1308)) and sound reproduction (dynamics) devices.

To obtain an additional volume for data storage, one uses data collectors (1310) such as diskettes or other removable disks, hard disks, direct access storage devices (DASD), optical drives (compact disks etc.), DVD drives, magnetic tape storages, and so on. The hardware (1300) can also include a network connection interface (1312)—LAN, WAN, Wi-Fi, Internet and others—for communicating with other computers located in the network. In particular, one can use a local-area network (LAN) or wireless Wi-Fi network, not connected to the worldwide web of the Internet. It must be considered that the hardware (1300) also includes various analog and digital interfaces for connection of the processor (1302) and other components of the system (1304, 1306, 1308, 1310, and 1312).

The computer system (1300) runs under the control of an Operating System (OS) (1314), which launches the various applications, components, programs, objects, modules, etc., in order to carry out the process described here. The application software should include an application to identify semantic ambiguity of language. One can also include a client dictionary, an application for automated translation, and other installed applications for imaging of text and graphic content (text processor etc.). Besides this, the applications, components, programs and other objects, collectively denoted by the symbol 1316 in FIG. 13, can also be launched on the processors of other computers connected to the computer system (1300) by a network (1312). In particular, the tasks and functions of the computer program can be distributed between computers in a distributed computing environment.

Figure 14:
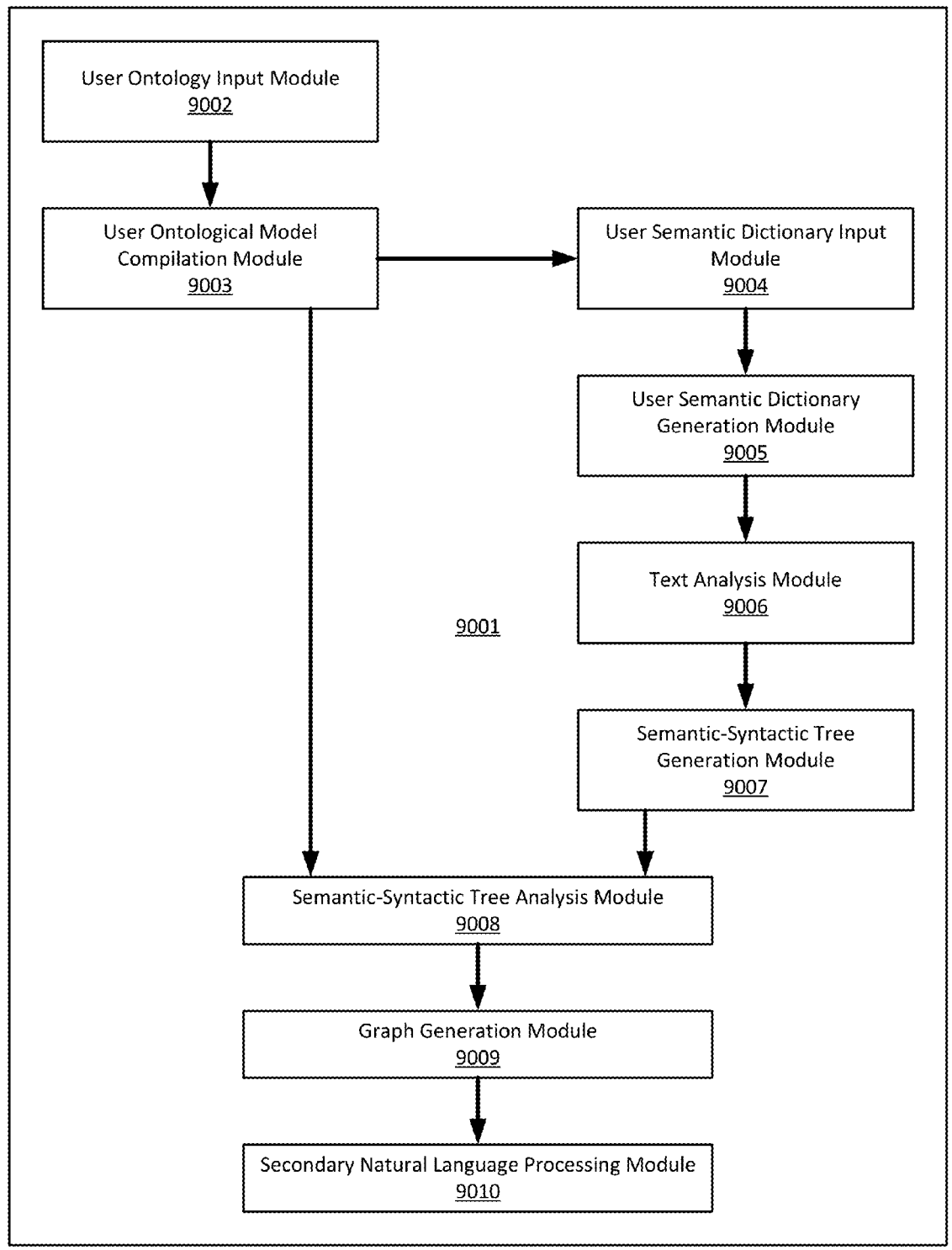
FIG. 14 illustrates a schematic diagram of an example system for generating and using user ontological model and user semantic dictionary for natural language processing of user-provided text.
Figure 15:
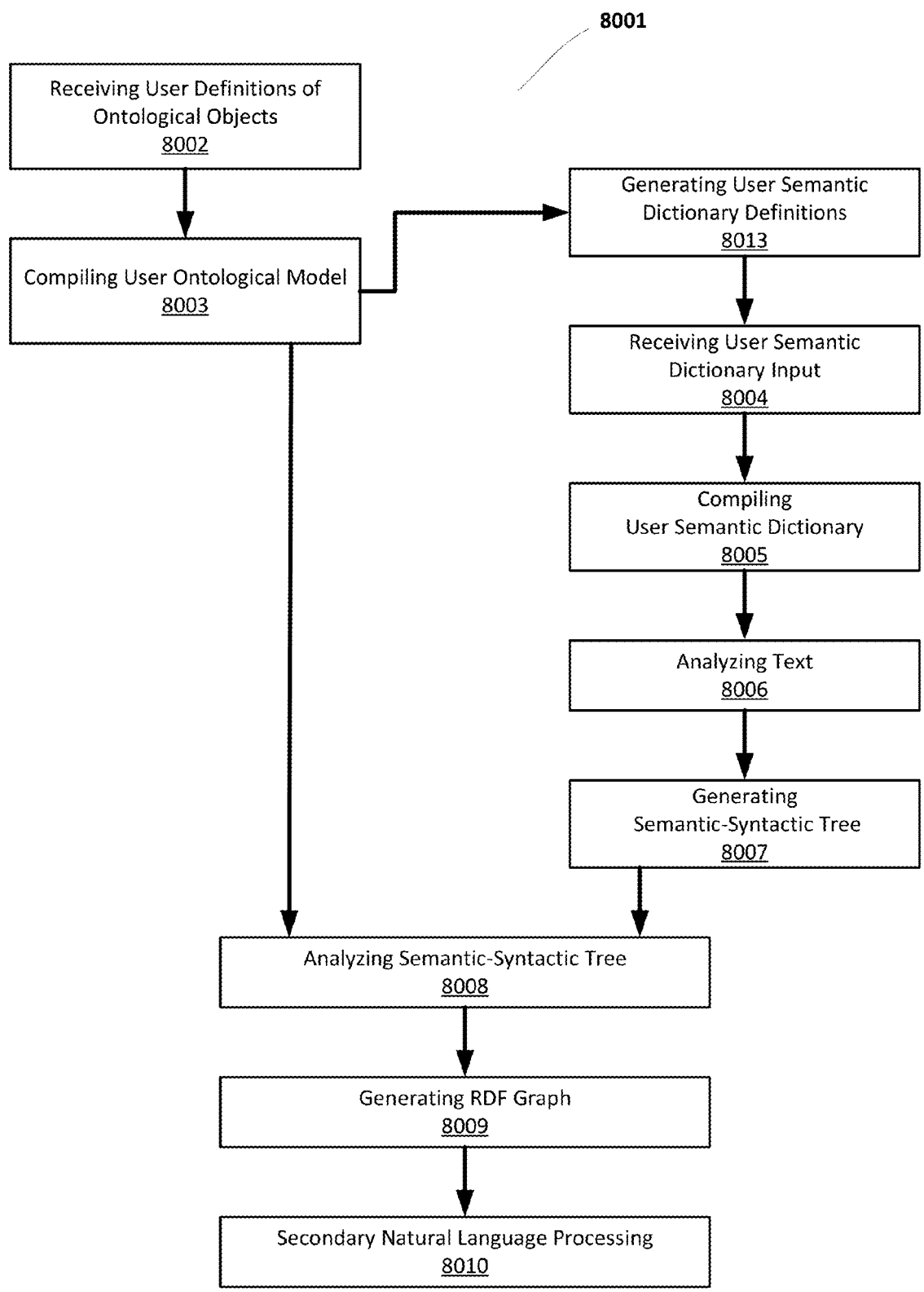
FIG. 15 shows an example method for generating and using user ontological model and user semantic dictionary for natural language processing of user-provided text.

FIG. 14 shows an example system for generating and using user ontological model (107, 314) and user semantic dictionary (105, 313) in natural language processing of user-provided text (109, 301) according to one aspect. FIG. 15 shows an example method for generating and using user ontological model (107, 314) and user semantic dictionary (105, 313) in natural language processing of user-provided text (109, 301), as shown in FIGS. 1A and 3.

As shown in FIGS. 14 and 15, the system 9001 includes a user ontology input module 9002 for receiving at step 8002 from a user definitions of user ontology (including definitions of user ontological objects, such as instances and concepts), which, for example, may come as a text file written by a user, or be generated automatically from data gathered from various sources and/or from user input through a program providing user interface. These definitions are used to generate (or to compile) a user ontological model (107, 314) and to generate input data for user semantic dictionary (105, 313) generation.

In an example aspect, the data comprise definitions of user ontological objects in the definition of user ontology (101), such as user instances of ontological concepts which are included in at least one existing main ontology. The data may also include definitions of user ontological concepts which are inheritors from ontological concepts in a main ontology. Besides, the data may also include definitions of user ontological concepts which are inherited from ontological concepts in user ontology. The definitions of user ontological objects, (e.g. user instances, and user concepts) indicate the concepts to which they belong and include some identifier uniquely identifying the user ontological objects (user instances and user concepts) within an ontological model. The ontology forms a name space containing identifiers of ontological objects. The definitions of user instances also include a natural language string expressing, associated with, or corresponding to the instance. The definitions of user instances may also identify the specific language of the natural language string, such as English or Russian.

In an example aspect, the user ontological model generation (or compilation) module 9003 compiles at step 8003 the definition data 101 and generates the corresponding user ontological object structures in computer memory 1304. These structures can be identified and located using their identifiers. The identifiers may be, for example, numeric, textual, meaningful or arbitrary. Their role is to provide a unique identification for the user ontological object structures within an ontology and ontological model.

In an example aspect, at step 8013 (shown in FIGS. 1A and 1C as 103) the user ontological model generation module 9003 also generates a file containing definitions of user semantic dictionary (150), with definitions of user semantic classes, user lexical classes, and/or user terms corresponding to the user ontological objects in the user ontological model (107, 314). Such definitions and such files may also be written by a user.

In an example aspect, the user semantic dictionary input module 9004 receives at step 8004 the definitions (150, FIG. 1) of the user semantic dictionary (including the identifiers (markers) used to identify the user ontological objects) and transfers them to the user semantic dictionary generation module 9005 to generate at step 8005 the user semantic dictionary (105, 313) incorporating the identifiers used to identify the user ontological objects on the basis of which the user semantic classes, user lexical classes, and user terms are created.

In an example aspect, the text analysis module 9006 analyzes at step 8006 the user-provided text as was described in FIG. 2 and FIG. 9 with use of main semantic dictionary and user semantic dictionary. During the deep analysis the process of pseudolemmatization is used. Namely, the process of pseudolemmatization is applied to a word unknown to system (such as a word that was originally introduced into the system by a definition in the user ontology 101, for example, word "Takayama"). As was described above, the process of pseudolemmatization comprises dividing a certain unit (word, for example, "Takayama") into possible lemmas and generating possible variants of word inflexions. All generated possible variants of inflexions of the unknown word are compared with the source text until a portion of the user-provided text is found such that one of possible variants of inflexions matches that text. If one of these generated word inflexion variants matches a natural language string in the source text of the sentence, the user lexical class from the user semantic dictionary is attached to this unit (word) in the sentence.

In one implementation this requires matching of grammatical and syntactic requirements for all parts of the text. Such requirements may be stored in the user semantic dictionary (105, 313) or may be inherited from the main semantic dictionary (106). For this inheritance mechanism to work, the items in the user semantic dictionary (105, 313) contain an identifier of the parent semantic class. If there are several matches, the matches involving items from the user semantic dictionary are preferably chosen. Once this analysis identifies a portion of the text, the tree generating module 9007 generates at step 8007 a semantic-syntactic tree node. This node identifies the user ontological object corresponding to the portion of the text identified by the text analysis module 9006 by containing a reference to the user ontological object or by containing a reference to a semantic class or a lexical class or a term containing a reference (an identifier) to the ontological object.

The text string provided by the user in the definition of the user instance is in lemmatized or dictionary form (singular, in nominative case, and so forth). However, in the analyzed text this text string may be in a different morphological form. In some aspects, this non-lemmatized form may be found in a morphological dictionary and then the lemma is found for matching with the user dictionary instance. In other cases, the lemmatized form of the text string is arrived at using morphological descriptions 201; this process is called pseudolemmatization.

In one aspect, a combination of ontological rules and ontological objects is an ontological model. An object contained in an ontological model may also be called an ontological object. Ontological rules are used to extract information from semantic-syntactic trees (as shown in FIGS. 10A and 10B). The information is extracted as information objects that can form object-property-value triplets, where the object is an information object (such as person) having a property, such as their name, their age, whether they a married, or their child, and the value may be a natural language string, such as a name, or a number, or a Boolean value, or another object (such as an information object representing a child of a person). Other values are also possible. Since a triplet can refer to another object (as a value), the triplets can form graph, such as an RDF graph (as shown in FIG. 12B).

The information extraction in an example aspect proceeds in two stages.

At the first stage, information objects corresponding to user instances are extracted from the semantic-syntactic tree. At this stage, the information object corresponding to the user instance Takayama_IndividualName is extracted from the semantic-syntactic tree constructed from the sentence "Takayama does a part-time job for IBM". The information object corresponding to the user instance Takayama_IndividualName is extracted from the semantic-syntactic tree (FIG. 10B) based on the identifier that is attributed to one of the nodes of semantic-syntactic tree. Namely this identifier is attributed to the node with user lexical class Takayama in the semantic-syntactic tree (FIG. 10B).

Also, at this stage possible properties of user instance are determined. Possible properties of user instance may be inherited from the parent concept. For example possible properties "last name", "first name", "patronymic" for user instance Takayama_IndividualName are inherited from the parent concept Person. Value of the property may be determined by rules and the fragment of semantic-syntactic tree. Value of the property of user instance assigned to corresponding extracted information object corresponding to the user instance, for example, Takayama_IndividualName.

At the second stage, the rules are applied to the semantic-syntactic tree to extract information objects corresponding to facts or entities. The results of the first stage are used at the second stage. Namely information objects corresponding to user instances along with rules may be used for extracting other information objects. In some cases information objects corresponding to user instances allow to extract information objects that may not be extracted without user ontological objects. For example, at this stage, an information object corresponding to the fact of occupation is extracted from the semantic-syntactic tree. This information object has properties "employer" and "employee" filled with an information object corresponding to an instance representing IBM Corporation and an information object corresponding to the user instance Takayama_IndividualName, respectively.

If the user instance Takayama_IndividualName were not present in the user ontological model, the semantic-syntactic tree would be as shown in FIG. 10A. The word "Takayama" does not have a lexical class in this case. In this case, only an information object corresponding to an instance representing IBM Corporation would be extracted from the sentence. An information object corresponding to the fact of occupation would not be extracted from the semantic-syntactic tree constructed from the sentence because the property "employee" would not be available from the semantic-syntactic tree.

In an example aspect, this semantic-syntactic tree is processed by the semantic-syntactic tree analysis module 9008 to identify at step 8008 a sub-tree or fragment of semantic-syntactic tree that matches a pattern of nodes using ontological rules from the main ontological model 108. This pattern of nodes may contain a node referring to an information object that was created based on the user ontological model (107, 314) and may allow to generate other information objects. This pattern of nodes allows determining a value to be assigned to a property of the information object referenced by the node and to generate at step 8009 an object-property-value triplet (which can be a part of an RDF graph) by the graph-generation module 9009.

Information objects corresponding to user ontological objects may be used at the second stage of information extraction, namely at the stage of information extraction with rules. It may result in generating new information objects, filling the properties of these new generated information objects by information objects corresponding to the user ontological objects. In this case information objects corresponding to the user ontological objects may be a value of property of the second information object.

On other hand, properties of the information objects corresponding to the user ontological objects may be filled by information objects generated at the second stage. In this case the information object corresponding to the user ontological object is an object, and the value of its property is a new generated information object.

This graph is provided to a secondary natural language processing module 9010 for further processing, for example, for semantic search, machine translation, or presenting to the user at step 8010.

Figure 16:
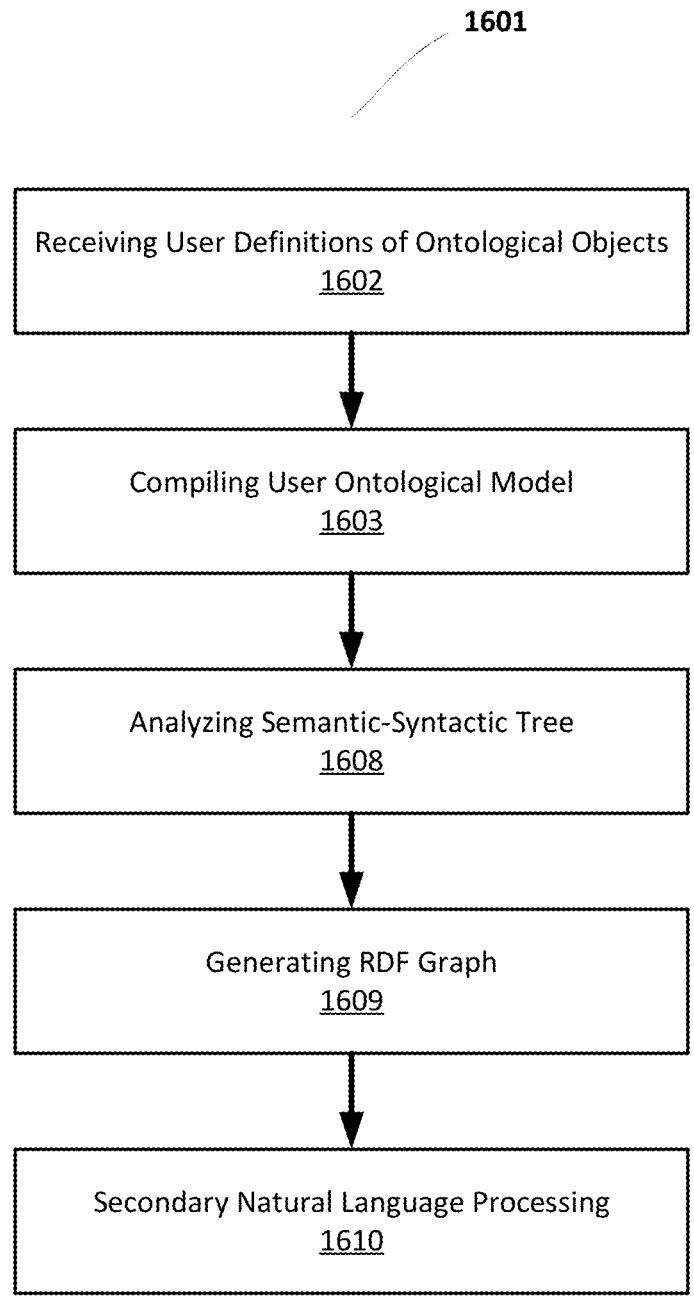
FIG. 16 illustrates a data flow diagram of an example method for generating and using user ontological model for natural language processing of user-provided text.
Figure 17:
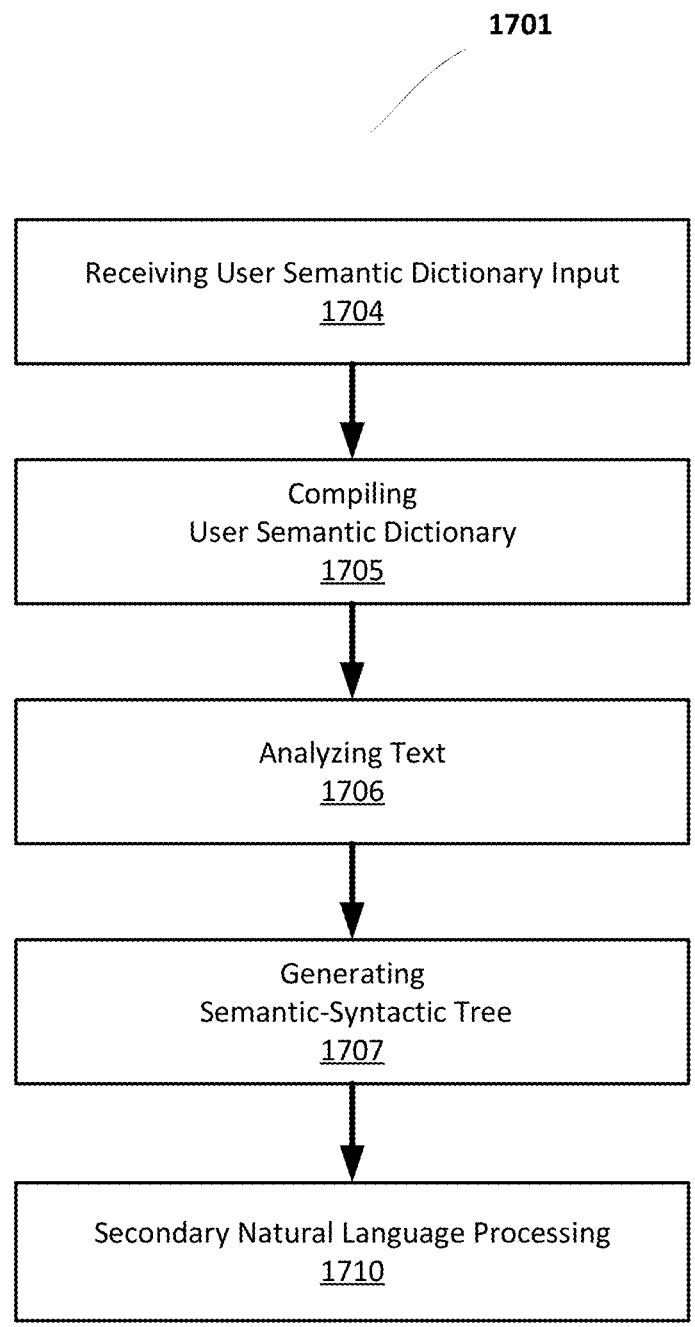
FIG. 17 illustrates a data flow diagram of an example method for generating and using user semantic dictionary for natural language processing of user-provided text.

FIG. 16 illustrates a data flow diagram of an example method for generating and using user ontological model for user-provided text. The method 1601 may be performed by the system 9001 of FIG. 14. As shown, at step 1602, the method 1601 includes receiving from a user a definition of an ontological object. At step 1603, the method 1600 includes generating a user ontological model (107, 314) based on the received definition of the user ontological object, as shown in FIGS. 1A and 3. The generated user ontological model (107, 314) may include a user ontological object structure comprising an identifier of the user ontological object. At step 1608, the method 1601 includes accessing a semantic-syntactic tree generated from the user-provided text with usage of user semantic dictionary and main semantic dictionary. The semantic-syntactic tree may include a plurality of connected nodes, where at least one node includes the identifier of the ontological object from the user ontological model (107, 314). For example, the node includes user lexical class that is interconnected with the user ontological object by the identifier. At step 1608, the method 1601 includes analyzing the semantic-syntactic tree to identify a subtree or fragment of a semantic-syntactic tree that matches a pattern of nodes that may include at least one node with the identifier of the user ontological object from the user ontological model (107, 314). The step of analyzing 1608 may further include using the identifier of the user ontological object in the at least one node to determine from the user ontological model (107, 314) a property of the user ontological object and to determine a value of the property with the use of pattern of nodes. At step 1609, the method 1601 includes generating an object-property-value triplet for the identified pattern of nodes. The generated object-property-value triplet may include the identifier of the user ontological object from the user ontological model (107, 314), the property of the user ontological object, and a value of the property of the user ontological object. The generated triplet may constitute a part of an RDF graph. At step 1610, the method 1601 further includes performing a secondary natural language processing of the user-provided text using the generated object-property-value triplet. The extracted information objects may be highlighted in the source text or represented to the user in any other known method. FIG. 17 illustrates a data flow diagram of an example method for generating and using user semantic dictionary (105, 313) for natural language processing of user-provided text. The method 1701 may be performed by the system 1400 of FIG.

14. As shown, at step 1704, the method 1701 includes receiving from a user ontological model generation module 9002 (i.e., from a user ontological model compiler) or directly from a user a definition of a semantic and/or lexical class and/or term associated with a user ontological object. At step 1705, the method 1701 includes generating a user semantic dictionary (105, 313) based on the received definition of the user semantic classes, user lexical classes, and/or user terms, as shown in FIGS. 1A and 3. The generated user semantic dictionary (105, 313) may include: a semantic dictionary structure comprising an identifier of the user ontological object, or a lexical class structure or term structure, or a semantic dictionary structure. At step 1706, the method 1701 includes text analysis described above for the set 9006 in FIG. 14. At step 1707, the method 1701 includes generating at least one node in a semantic-syntactic tree. The semantic-syntactic tree may include a plurality of connected nodes, where the at least one node includes the identifier of the user ontological object from the semantic dictionary structure in the user semantic dictionary (105, 313). At step 1710, the method 1701 further includes performing secondary natural language processing of the user-provided text using the generated semantic-syntactic tree.

All the routine operations in the use of the implementations can be executed by the operating system or separate applications, components, programs, objects, modules or sequential instructions, generically termed "computer programs". The computer programs usually constitute a series of instructions executed at different times by different data storage and memory devices on the computer. After reading and executing the instructions, the processors perform the operations needed to initialize the elements of the described implementation. Several variants of implementations have been described in the context of fully functioning computers and computer systems. The specialists in the field will properly judge the possibilities of disseminating certain modifications in the form of various program products on any given types of information media. Examples of such media are power-dependent and power-independent memory devices, such as diskettes and other removable disks, hard disks, optical disks (such as CD-ROM, DVD, flash disks) and many others. Such a program package can be downloaded via the Internet.

In the specification presented above, many specific details have been presented solely for explanation. It is obvious to the specialists in this field that these specific details are merely examples. In other cases, structures and devices have been shown only in the form of a block diagram to avoid ambiguity of interpretations.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method comprising:
   identifying, by a hardware processor, a first text provided by a user;
   identifying, by the hardware processor, a semantic dictionary comprising semantic-syntactic data, the semantic-syntactic data comprising at least one datum specific to the user;
   identifying, by the hardware processor, a first portion of the first text that matches the semantic-syntactic data;
   generating a node for a semantic-syntactic tree, wherein the node identifies a user ontological object of the semantic-syntactic data corresponding to the first portion of the first text;
   storing, by the hardware device, the semantic-syntactic tree comprising the generated node in a data storage device; and
   performing, by the hardware processor using the stored semantic-syntactic tree, natural language processing of at least one of the first text, the first portion of the first text, a second portion of the first text, or a second text provided by the user.

2. The method of claim 1, wherein the semantic-syntactic data comprises a semantic class.

3. The method of claim 1, wherein the semantic-syntactic data comprises an instance of a semantic class.

4. The method of claim 1, wherein the semantic-syntactic data comprises a lexical class.

5. The method of claim 1, wherein the semantic-syntactic data comprises an instance of a lexical class.

6. The method of claim 1, wherein the first text comprises natural language.

7. A system comprising:
   a memory to store a first text provided by a user; and
   a hardware processor, operatively coupled to the memory, to:
     identify a semantic dictionary comprising semantic-syntactic data, the semantic-syntactic data comprising at least one datum specific to the user;
     identify a first portion of the first text that matches the semantic-syntactic data;

generate a node for a semantic-syntactic tree, wherein the node identifies a user ontological object of the semantic-syntactic data corresponding to the first portion of the first text;

store the semantic-syntactic tree comprising the generated node in a data storage device; and perform, using the stored semantic-syntactic tree, natural language processing of at least one of the first text, the first portion of the first text, a second portion of the first text, or a second text provided by the user.

8. The system of claim 7, wherein the semantic-syntactic data comprises a semantic class.

9. The system of claim 7, wherein the semantic-syntactic data comprises an instance of a semantic class.

10. The system of claim 7, wherein the semantic-syntactic data comprises a lexical class.

11. The system of claim 7, wherein the semantic-syntactic data comprises an instance of a lexical class.

12. The system of claim 7, wherein the first text comprises natural language.

13. A non-transitory computer-readable storage medium, having instructions stored therein, which when executed, cause a hardware processor to:

identify a first text provided by a user;

identify a semantic dictionary comprising semantic-syntactic data, the semantic-syntactic data comprising at least one datum specific to the user;

identify a first portion of the first text that matches the semantic-syntactic data;

generate a node for a semantic-syntactic tree, wherein the node identifies a user ontological object of the semantic-syntactic data corresponding to the first portion of the first text; and store the semantic-syntactic tree comprising the generated node in a data storage device; and perform, using the stored semantic-syntactic tree, natural language processing of at least one of the first text, the first portion of the first text, a second portion of the first text, or a second text provided by the user.

14. The non-transitory computer-readable storage medium of claim 13, wherein the semantic-syntactic data comprises a semantic class.

15. The non-transitory computer-readable storage medium of claim 13, wherein the semantic-syntactic data comprises an instance of a semantic class.

16. The non-transitory computer-readable storage medium of claim 13, wherein the semantic-syntactic data comprises a lexical class.

17. The non-transitory computer-readable storage medium of claim 13, wherein the semantic-syntactic data comprises an instance of a lexical class.

18. The non-transitory computer-readable storage medium of claim 13, wherein the first text comprises natural language.

* * * * *